US007418596B1

(12) United States Patent
Carroll et al.

(10) Patent No.: US 7,418,596 B1
(45) Date of Patent: Aug. 26, 2008

(54) SECURE, EFFICIENT, AND MUTUALLY AUTHENTICATED CRYPTOGRAPHIC KEY DISTRIBUTION

(75) Inventors: Christopher Carroll, Natick, MA (US); Varsha Clare, Pleasanton, CA (US); Gerry Flynn, Chester, NJ (US); Brian Green, Tracy, CA (US); Steve Rados, San Ramon, CA (US); Steve Thomas, Clayton, CA (US)

(73) Assignee: Cellco Partnership, Bedminster, NJ (US)

( * ) Notice: Subject to any disclaimer, the term of this patent is extended or adjusted under 35 U.S.C. 154(b) by 923 days.

(21) Appl. No.: 10/200,922

(22) Filed: Jul. 23, 2002

Related U.S. Application Data

(60) Provisional application No. 60/367,203, filed on Mar. 26, 2002.

(51) Int. Cl.
*H04L 9/00* (2006.01)
*H04K 1/00* (2006.01)
*G06F 7/04* (2006.01)
*H04M 1/66* (2006.01)

(52) U.S. Cl. .................. 713/169; 713/171; 713/182; 726/5; 380/247; 380/278; 380/282; 380/44; 455/410; 455/411

(58) Field of Classification Search ............... 713/169
See application file for complete search history.

(56) References Cited

U.S. PATENT DOCUMENTS

| 5,768,373 A * | 6/1998 | Lohstroh et al. ......... 380/286 |
| 6,094,486 A * | 7/2000 | Marchant .................. 380/52 |
| 6,453,159 B1 * | 9/2002 | Lewis ..................... 455/411 |
| 6,553,493 B1 * | 4/2003 | Okumura et al. ......... 713/170 |
| 6,567,919 B1 * | 5/2003 | Yanagihara et al. ......... 726/7 |
| 6,654,457 B1 * | 11/2003 | Beddus et al. ........ 379/265.02 |
| 6,785,823 B1 * | 8/2004 | Abrol et al. .................. 726/7 |
| 7,020,773 B1 * | 3/2006 | Otway et al. .............. 713/171 |
| 7,024,557 B1 * | 4/2006 | Moles et al. .............. 713/170 |
| 7,107,620 B2 * | 9/2006 | Haverinen et al. .......... 726/29 |

(Continued)

FOREIGN PATENT DOCUMENTS

EP 1748615 A1 * 1/2007

(Continued)

OTHER PUBLICATIONS

Praveena et al, Achieving energy efficient and secure communication in wireless sensor networks, 2006, IEEE, pp. 1-5☐☐.*

(Continued)

*Primary Examiner*—Ayaz Sheikh
*Assistant Examiner*—Aravind K Moorthy
(74) *Attorney, Agent, or Firm*—McDermott Will & Emery LLP

(57) ABSTRACT

Systems and methods disclosed herein provide secure, efficient, and mutually authenticated cryptographic key distribution. A client or client manufacturer may pre-generate and pre-encrypt the cryptographic keys, store the encrypted keys within the client, and deliver such keys to the serving network's access server via the client, while also relying upon, if available, the authentication performed by a trusted access server of an intermediate network which the client must traverse in order to obtain access the serving network. If not available, a client password stored within the client may be used to enable client authentication by the serving network prior to acceptance of the delivered cryptographic keys.

27 Claims, 10 Drawing Sheets

U.S. PATENT DOCUMENTS

2002/0120844 A1    8/2002  Faccin et al.
2003/0031320 A1*   2/2003  Fan et al. .................... 380/255
2003/0220107 A1    11/2003 Lioy et al.
2005/0175184 A1*   8/2005  Grover et al. ............... 380/278

FOREIGN PATENT DOCUMENTS

WO    WO 02101971  A2 *  12/2002

OTHER PUBLICATIONS

Bruschi et al, Secure Multicast in Wireless Networks of Mobile Hosts: Protocols and Issues, 2002, ACM, pp. 503-511.*

Nilsson et al, Key Management and Secure Software Updates in Wireless Process Control Environments, 2008, ACM, pp. 100-108.*

Harding et al, Wireless Authentication using Remote Passwords, 2008, ACM, pp. 24-29.*

"3rd Generation Partnership Project 2" "3GPP2" Wireless IP Network Standard.

* cited by examiner

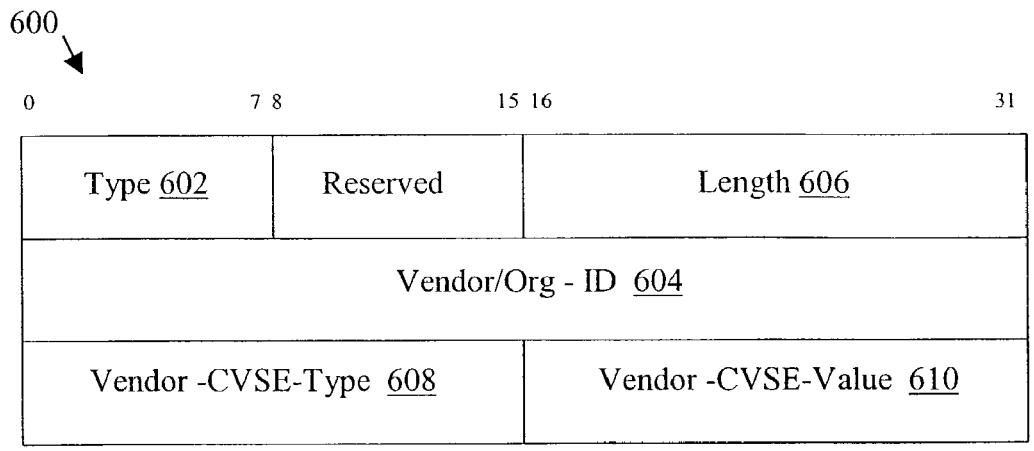
*FIG. 6A*
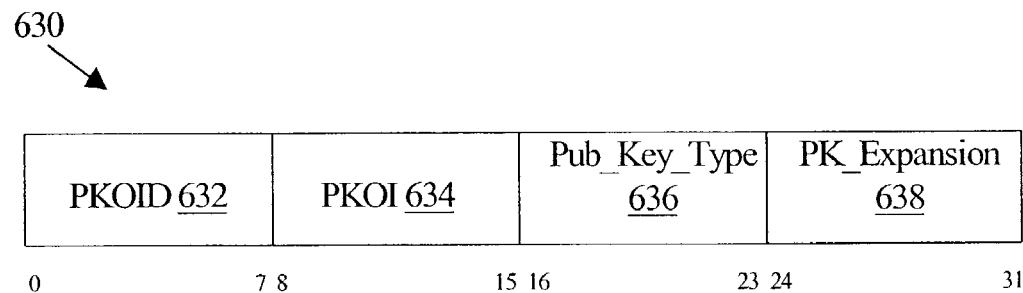
*FIG. 6B*
| Pub_key_Type Value | Public Key Algorithm |
|---|---|
| 00 | Reserved |
| 01 | RSA - 1024 |
| 02 | RSA - 768 |
| 03 | RSA - 2048 |
| 04 | TBD |
| 05 | TBD |
| 06 | TBD |
| 07 | TBD |
Note: The complete table can support up to 256 algorithm options.
*FIG. 6C*

| PKOID (HEX) | Public Key Organization (PKO) | PKOID (HEX) | Public Key Organization (PKO) |
|---|---|---|---|
| 00 | RESERVED | 40 | Sanyo Fisher Company |
| 01 | RESERVED | 41 | Sharp Laboratories of America |
| 02 | RESERVED | 42 | Sierra Wireless, Inc. |
| 03 | RESERVED | 43 | Sony Electronics |
| 04 | RESERVED | 44 | Synertek, Inc. |
| 05 | RESERVED | 45 | Tantivy Communications, Inc. |
| 06 | RESERVED | 46 | Tellus Technology, Inc. |
| 07 | RESERVED | 47 | Wherify Wireless, Inc. |
| 08 | RESERVED | 48 | Airbiquity |
| 09 | RESERVED | 49 | ArrayComm |
| 0A | Verizon Wireless | 4A | Celletra Ltd. |
| 0B | AAPT Ltd. | 4B | CIBERNET Corporation |
| 0C | ALLTEL Communications | 4C | CommWorks Corporation, a 3Com Company |
| 0D | Angola Telecom | 4D | Compaq Computer Corporation |
| 0E | Bell Mobility | 4E | ETRI |
| 0F | BellSouth International | 4F | Glenayre Electronics Inc. |
| 10 | China Unicom | 50 | GTRAN, Inc. |
| 11 | KDDI Corporation | 51 | Logica |
| 12 | Himachal Futuristic Communications Ltd. | 52 | LSI Logic |
| 13 | Hutchison Telecom (HK), Ltd. | 53 | Metapath Software International, Inc. |
| 14 | IUSACELL | 54 | Metawave Communications |
| 15 | Komunikasi Selular Indonesia (Komselindo) | 55 | Openwave Systems Inc. |
| 16 | Korea Telecom Freetel, Inc. | 56 | ParkerVision, Inc. |
| 17 | Leap | 57 | QUALCOMM, Inc. |
| 18 | LG Telecom, Ltd. | 58 | QuickSilver Technologies |
| 19 | Mahanagar Telephone Nigam Limited (MTNL) | 59 | Research Institute of Telecommunication Transmission, MII (RITT) |
| 1A | Nextel Communications, Inc. | 5A | Schema, Ltd. |
| 1B | Operadora UNEFON SAde CV | 5B | SchlumbergerSema |
| 1C | Pacific Bangladesh Telecom Limited | 5C | ScoreBoard, Inc. |
| 1D | Pegaso PCS, S.A. DE C.V. | 5D | SignalSoft Corp. |
| 1E | Pele-Phone Communications Ltd. | 5E | SmartServ Online, Inc. |
| 1F | Qwest | 5F | TDK Corporation |
| 20 | Reliance Infocom Limited | 60 | Texas Instruments |
| 21 | Shinsegi Telecomm, Inc. | 61 | Wherify Wireless, Inc. |
| 22 | Shyam Telelink Limited | 62 | Acterna |
| 23 | SK Telecom | 63 | Anritsu Company |

*FIG. 7*

| 24 | Sprint PCS | 64 | Ericsson |
|---|---|---|---|
| 25 | Tata Teleservices Ltd. | 65 | Grayson Wireless |
| 26 | Telecom Mobile Limited | 66 | LinkAir Communications, Inc. |
| 27 | Telstra Corporation Limited | 67 | Racal Instruments |
| 28 | Telus Mobility Cellular, Inc. | 68 | Rohde & Schwarz |
| 29 | US Cellular | 69 | Spirent Communications |
| 2A | 3G Cellular | 6A | Willtech, Inc. |
| 2B | Acer Communication & Multimedia Inc. | 6B | Wireless Test Systems |
| 2C | AirPrime, Inc. | 6C | Airvana, Inc. |
| 2D | Alpine Electronics, Inc. | 6D | COM DEV Wireless |
| 2E | Audiovox Communications Corporation | 6E | Conductus, Inc. |
| 2F | DENSO Wireless | 6F | Glenayre Electronics Inc. |
| 30 | Ditrans Corporation | 70 | Hitachi Telecom (USA), Inc. |
| 31 | Fujitsu Network Communication, Inc. | 71 | Hyundai Syscomm Inc. |
| 32 | Gemplus Corporation | 72 | ISCO |
| 33 | Giga Telecom Inc. | 73 | LG Electronics, Inc. |
| 34 | Hyundai CURITEL, Inc. | 74 | LinkAir Communications, Inc. |
| 35 | InnovICs Corp | 75 | Lucent Technologies, Inc. |
| 36 | Kyocera Corporation | 76 | Motorola CIG |
| 37 | LG Electronics, Inc. | 77 | Nortel Networks |
| 38 | LinkAir Communications, Inc. | 78 | Repeater Technologies |
| 39 | Motorola, Inc. | 79 | Samsung Electronics Co., Ltd. |
| 3A | Nokia Corporation | 7A | Starent Networks |
| 3B | Novatel Wireless, Inc. | 7B | Tahoe Networks, Inc. |
| 3C | OKI Network Technologies | 7C | Tantivy Communications, Inc. |
| 3D | Pixo | 7D | WaterCove Networks |
| 3E | Research In Motion | 7E | Winphoria Networks, Inc. |
| 3F | Samsung Electronics Co., Ltd. | 7F | ZTE Corporation |

Note: 80 through FF shall be assigned by the PKOID administrator (3GPP2 TSG-P Subcommittee).

SECURE, EFFICIENT, AND MUTUALLY AUTHENTICATED CRYPTOGRAPHIC KEY DISTRIBUTION

CROSS REFERENCES TO RELATED APPLICATIONS

This application claims the benefit of priority under 35 U.S.C. §119(e) from co-pending commonly owned U.S. provisional patent application Ser. No. 60/367,203, entitled A Method For Secure, Efficient, and Mutually Authenticated Cryptographic Key Distribution, filed Mar. 26, 2002.

FIELD OF THE INVENTION

The present subject matter relates to techniques for distribution of cryptographic keys to facilitate communication of client equipment via a network such as MIP and/or CHAP keys, to client and server equipment and/or software for implementing the key distribution, and to networks (including for example wireless networks) utilizing the key distribution technology.

BACKGROUND

Digital data communication is fast becoming a ubiquitous aspect of modern life. The increasing development of technology has advanced dissemination of information through telecommunication. The Internet, as well as private local area and wide area data networks, enable transfer of large volumes of data at ever increasing speed and reliability. The Internet is now being used for interactive communication as well as for its original objective of information access.

Concurrent with the explosion in demand for data services, there has been an ever-increasing demand for mobile communications. The number of cellular telephone customers, for example, has grown exponentially. As part of the technical development of the networks to meet the demand for mobile communications, carriers have migrated from an analog-based technology to several digital transport technologies, wherein digital data is "packetized" and transmitted across digital networks. Newer versions of digital wireless communication networks, or mobile packet switched data networks, support a variety of data communication services that are intended to extend the common data communication capabilities of the wired domain to the wireless mobile domain. The current trend is toward the Third Generation of Wireless Telephony (3G) networks (e.g., 3G-1x networks). The 3RD Generation Partnership Project 2 (3GPP2) standard entitled Wireless IP Network Standard, 3GPP2 P.S0001A, Version 3.0.0, © 3GPP2, version date Jul. 16, 2001 (the "3GPP2 Standard", a.k.a. the IS-835 Standard") codifies the use of mobile IP in a 3G-1x packet data network, also referred to as a code division multiple access (CDMA) or CMDA2000-1x packet data network.

To communicate via a packet switched data network, each device must have a packet protocol address. In common forms of data networks the address is an Internet Protocol (IP) address. Most often, data is transferred using Transmission Control Protocol/Internet Protocol (TCP/IP). With current versions of IP, the IP addresses are a scarce commodity, typically administered and assigned through an Internet service provider (ISP).

To send a data packet (i.e., packetized digital data) over an IP packet network, the source device must know its own address plus the address of the destination device. It is possible to assign the address when the user's device first logs-in, or when the user requests data after an idle time, assuming the user's device initiates a new connection after power-up or re-connection after time-out. Generally, when a device sends a request for data to a server, the server obtains the currently assigned IP address from a request packet sent by the device, hence the server can properly address one or more response packet(s) to the requesting device, whether that device is a fixed (i.e., line connected) device or mobile (i.e., wireless) station.

The addresses can be reassigned when the terminal goes off-line or remains idle for some extended period. In the wireless domain, the IP addresses are assigned and reassigned by a network element. For example, after establishment of a point-to-point protocol (PPP) connection between the mobile station and a packet data serving node (PDSN) in the network, an IP address can be assigned by the PDSN. With this approach, addresses are stored in a database of the PDSN. Alternatively, an external Dynamic Handshake Challenge Protocol (DHCP) server or a home agent (HA) server can assign the IP address to the mobile station. There are two somewhat different versions of IP management techniques and services being deployed for mobile station subscribers, Simple IP (SIP) and Mobile IP (MIP). These IP address services are discussed, for example, in the IS-835 Standard.

SIP is a service in which the user is assigned a dynamic IP address from the serving PDSN. A service provider network (e.g., a radio network (RN)) provides the user's mobile station with IP routing service. The user's mobile station retains its IP address as long as it is served by the RN, which has connectivity to the PDSN that assigned the IP address to mobile station. With the SIP, there is no IP address mobility beyond that PDSN, and as a result, there is no handoff between PDSNs.

MIP is a service in which the user is provided IP routing service to a public IP network and/or secure IP routing service to predefined private IP networks. A mobile station is able to use either a non-zero static IP address or a dynamically assigned IP address belonging to its home IP network HA. The zero HA address for a mobile station indicates that a dynamic HA allocation is required for the mobile station. If the mobile station requests a dynamic HA, then the mobile station should also request a dynamically assigned home address along with dynamic HA allocation. The mobile station is able to maintain a persistent IP address even when handing off between radio networks connected to separate PDSNs. A network (including a HA) may be any of a variety of known networks, such as a home IP network, private network, home access provider network (e.g., a IMT-2000 cellular network), or publicly accessible ISP network.

A remote authentication dial-in user service (RADIUS) server is also included in the network and interfaces with the PDSN and IP network to perform authentication, authorization, and accounting (AAA) for a user's sessions. Presently, authentication and authorization are performed inefficiently using a public key algorithm to contemporaneously generate, encrypt, or decrypt cryptographic keys for delivery between a client, with limited computational capabilities, and a serving network. The serving network is solely relied upon to authenticate the client.

SUMMARY OF THE INVENTION

Systems and methods in accordance with the present invention provide a secure, efficient, and mutually authenticated method of distributing or initially bootstrapping cryptographic keys by allowing a client or client manufacturer to pre-generate and pre-encrypt the cryptographic keys, store the encrypted keys within the client, and deliver such keys to the serving network's access server via the client. Such systems and methods may utilize, if available, authentication performed by a trusted access server of an intermediate network which the client must traverse in order to obtain access to the serving network. Or, if not available, a client password stored within the client may be used to enable client authentication by the serving network prior to accepting the delivered cryptographic keys. A particularly advantageous use of the key distribution relates to distribution of encryption keys to wireless portable communication terminals.

The inventive concepts are applicable to a variety of different wireless networks supporting packet data communications services, such as GSM/GPRS, UMTS, etc., as may be implemented in a variety of different frequency bands. A logical evolution of IS-95A standard types of digital wireless communications, toward a third generation (3G) implementation, involves an upgrade of the digital technology toward CDMA2000-1x or 1x. The attendant 1x Radio Transmission Technology (1xRTT) may use a 1.25 MHz CDMA bandwidth to form a 1xRTT CDMA network implementation. Although there are many benefits associated with such 1x systems, the two most significant benefits are voice capacity increase and high-speed packet data. Studies and simulations have shown that voice capacity increase is between 1.5 to 2 fold over IS-95A and that data can burst at a raw speed of 153.6 Kb/s with a throughput of 144 Kb/s in the initial release.

A 1xRTT CDMA network implementation provides the ability for mobile professionals with their laptop PCs, Pocket PCs, Palm, and other wireless devices to access the Internet, their email, or corporate intranets in a wireless environment at higher data rates with broader coverage for a richer experience. It enables faster access, richer browser experience with graphics and images, and increased speed and mobility for laptops and PDAs. 1x can support vertical applications, such as telemetry, transactions processing, and database access. Hence, it is envisioned that the techniques described herein will be useful in a CDMA 1xRTT network, such as that specified in "Wireless IP Network Standard, TIA/ELA/IS-835."

Systems and methods of key distribution in accordance with the present techniques may take any of a variety of forms. For example, a method for secure distribution of cryptographic key(s) using mutual authentication may include the generation of Public Key Algorithm Public key and Private key pairs with storage of the Private key within an Access Server. Additionally, generation of cryptographic key(s), an Access Server authenticator, and a client password are accomplished, with storage of cryptographic key(s), Access Server authenticator, and client password within a client device (e.g., a mobile station). Public key encryption of the cryptographic key(s), server authenticator, and client password are performed and the encrypted payload is stored within the client. Delivery of the client password using out-of-band channel to the Access Server is accomplished, along with delivery of the encrypted cryptographic key(s), server authenticator, and client password to the Access Server from the client.

Private key decryption of the encrypted cryptographic key(s), server authenticator, and client password by the Access Server is then performed. The Access Server compares the decrypted client password with the out-of-band delivered client password, and if both passwords are the same, the Access Server authentication of the client is successful and the Access Server accepts the decrypted cryptographic key(s). Otherwise, the Access Server discards the decrypted cryptographic key(s).

The Access Server returns the decrypted server authenticator to the client. The client then compares the server authenticator returned by the Access Server with the server authenticator stored within client. If both authenticators are the same, client authentication of Access Server is successful and the client accepts the cryptographic keys. Otherwise, the client discards the cryptographic key(s).

In another form, a method for secure distribution of cryptographic key(s) using shared mutual authentication includes the generation of Public Key Algorithm Public key and Private key pair, as before, with storage of the Private key within an Access Server. An intermediate client identifier associated with the intermediate Access Server is stored within the Access Server. There is a pre-establishment of a security association between an intermediate client and an intermediate Access Server. The method includes generation of cryptographic key(s) and an Access Server authenticator, and storage of the same within the client.

Public key encryption of the cryptographic key(s) and the server authenticator is performed, along with storage within the client, as an encrypted payload including the cryptographic key(s) and server authenticator. The intermediate Access Server authenticates the intermediate client based on the security association and subsequently delivers the authenticated intermediate client identifier to the Access Server. Delivery of the encrypted cryptographic key(s) and server authenticator to the Access Server from the client is accomplished. The Access Server, using the Private key, decrypts the encrypted cryptographic key(s) and server authenticator. The Access Server compares the intermediate client identifier delivered by intermediate Access Server with the intermediate client identifier stored within the Access Server. If both identifiers are the same, the Access Server accepts the decrypted cryptographic key(s). Otherwise, the Access Server discards the decrypted cryptographic key(s).

The Access Server returns the decrypted server authenticator to client. The client compares the server authenticator returned by the Access Server with the server authenticator stored within client. If both authenticators are the same, the client authentication of the Access Server is successful and the client accepts the cryptographic keys. Otherwise, the client discards the cryptographic key(s).

Those skilled in the art will recognize that the inventive techniques for key distribution as outlined herein, by way of example, may be used to distribute keys across a variety of private and public data networks (e.g. intranets and the Internet).

BRIEF DESCRIPTION OF THE DRAWINGS

The drawing figures depict preferred embodiments by way of example, not by way of limitations. In the figures, like reference numerals refer to the same or similar elements.

FIG. 6A is a diagram depicting vendor/organization specific extensions to the IS-835 Standard, in accordance with an embodiment.

FIGS. 6B, 6C and 7 depict public key identifier information and extensions to the IS-835 Standard, in accordance with an embodiment.

FIGS. 6B, 6C and 7 depict public key identifier information and extensions to the IS-835 Standard, in accordance with an embodiment.

DETAILED DESCRIPTION OF THE PREFERRED EMBODIMENTS

Figure 1:
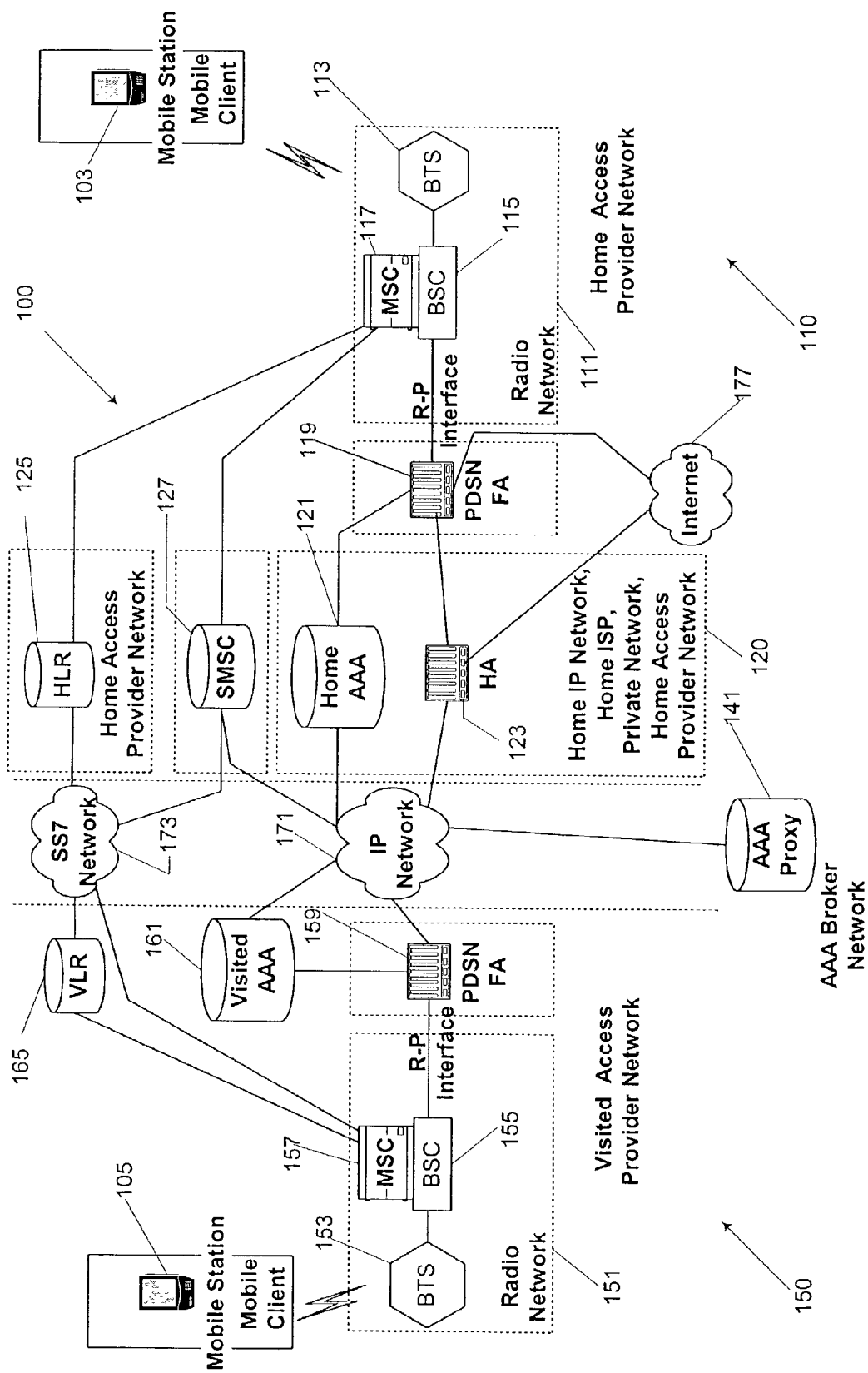
FIG. 1 is a block diagram of a wireless communication network.

The present systems and methods provide secure, efficient, and mutually authenticated cryptographic key distribution. Such systems and methods allow a client or client manufacturer to pre-generate and pre-encrypt cryptographic keys, store the encrypted keys within the client, and deliver such keys to a serving network's access server via the client. Such systems and methods may also rely upon, if available, authentication performed by a trusted access server of an intermediate network which the client must traverse in order to obtain access the serving network. If not available, a client password stored within the client may be used to enable client authentication by the serving network prior to acceptance of the delivered cryptographic keys. A particularly advantageous use of the key distribution in accordance with the present invention relates to distribution of encryption keys to wireless portable communication terminals. Although, in various embodiments, other types of devices may additionally or alternatively be supported.

The present invention can be implemented with any of a variety of wired or wireless client devices. Portable versions of such devices may include cellular telephones, pagers, personal digital assistants (PDAs), e-mail devices, Internet enabled devices, Web enabled devices or some combination thereof, as examples. The key distribution techniques are applicable to fixed wireline networks and associated client devices. However, an initial application is in a wireless network, hence, further discussion will concentrate on such a network and the wireless client devices used in such a network.

As will be appreciated by those skilled in the art, a mobile station may be linked to service providers, content providers, serving nodes, accounting systems, and other mobile stations by any of a variety of wired or wireless communication and network means, or any combination thereof, such as land lines, satellite links, fiber links, telephone networks, the Internet, intranets, extranets, wide or local area networks virtual private networks, the World Wide Web (the "Web"), and so forth.

In the preferred form, the present invention can be implemented with a variety of different wireless networks supporting packet data communications services, such as GSM /GPRS, UMTS, etc., as may be implemented in a variety of different frequency bands. A logical evolution of IS-95A Standard types of digital wireless communications, toward a third generation (3G) implementation, involves an upgrade of the digital technology toward CDMA2000-1x or 1x. The attendant 1x Radio Transmission Technology (1xRTT) may use a 1.25 MHz CDMA bandwidth to form a 1xRTT CDMA network implementation. Although there are many benefits associated with such 1x systems, the two most significant benefits are voice capacity increase and high-speed packet data. Studies and simulations have shown that voice capacity increase is between 1.5 to 2 fold over IS-95A and that data can burst at a raw speed of 153.6 Kb/s with a throughput of 144 Kb/s in the initial release.

A 1xRTT CDMA network implementation provides the ability for mobile professionals with their laptop PCs, Pocket PCs, Palm, and other wireless devices to access the Internet, their email, or corporate intranets in a wireless environment at higher data rates with broader coverage for a richer experience. It enables faster access, richer browser experience with graphics and images, and increased speed and mobility for laptops and PDAs. 1x can support vertical applications, such as telemetry, transactions processing, and database access. Hence, the preferred embodiment provides improved accounting and billing capabilities in a 1x system, such as a 1xRTT system operating in the 1.25 MHz band. To appreciate applicability of the inventive techniques to such a network, it may be helpful first to consider the typical architecture of such a network and the operation thereof, particularly as it relates to providing packet data communication services.

FIG. 1 is a block diagram of a representative 1xRTT CDMA network 100, within which the key distribution can be implemented. Network 100 may comprise access networks operated by a large number of separate and independent service providers. For discussion purposes, the drawing shows two such access networks 110 and 150. Through the providers' access networks, the overall network 100 offers mobile communications to customers using mobile stations throughout a wide geographic area. Different customers subscribe to service through different providers and are assigned to specific radio networks (RNs) 111 or 151 as their home networks within access networks 110 or 150; the mobile stations and network elements are provisioned accordingly. Although the illustrated network 100 will provide services for many customers through their mobile stations, for discussion purposes, the drawing shows only two such mobile stations, i.e., MS 103 and MS 105, and those two mobile stations are assumed to belong to customers of the access provider network 110. As shown, the MS 103 is operating within the service area of its home access provider network 110. By contrast, the customer using the MS 105 has roamed out of the service area of its home access provider network 110 and into a different geographic area where MS 105 is receiving wireless service from a different access provider network 150, referred to as the "visited" access provider network.

As previously mentioned, MS 103 and MS 105 may take one or more of several forms. For example, a MS may be an enhanced mobile telephone station with a display and user input capabilities to support certain text and image communications, for example, for e-mail and web surfing applications. Another mobile station may comprise a PDA with built-in wireless communication capabilities, such as shown with MS 103 and MS 105 in FIG. 1. As another alternative, a mobile station may comprise a wireless device such as a mobile telephone having data communication capabilities that may be connected to a portable computing device such as a laptop computer. Network 100 supports both Simple IP (SIP) and Mobile IP (MIP) types of address management services for mobile customers that subscribe to the packet data communications. It may be helpful to summarize these IP address functions of the network 100.

Simple IP (SIP) is a service in which the user is assigned a dynamic IP address from a serving PDSN. A service provider network, such as networks 110 or 150, provides the user's mobile station (e.g., MS 103 or MS 105) with IP routing service. The user retains its IP address as long as it is served by a radio network (e.g., RN 111) that has connectivity to the PDSN (e.g., PSDN 119) that assigned the IP address to the user's mobile station. There is no IP address mobility beyond this PDSN, and as a result, there is no handoff between PDSNs.

Mobile IP (MIP) is a service in which the subscriber is assigned an IP address from a "home" network (e.g., home agent (HA) 123 of network 110). With MIP service, the assigned IP address does not change as the mobile station changes it's point of attachment to the network 100 (e.g. by roaming to a new provider network, or by roaming across a PDSN boundary within a single provider's network). If dynamically assigned, the IP address remains assigned to the particular mobile station until that station logs-off, is inactive for longer than some set period, or the data session is otherwise terminated. Therefore, with respect to FIG. 1, with MIP MS 105 maintains its IP address when roaming from network 110 to network 150.

In FIG. 1, the elements of RN 111 of the home access provider's network 110, include MS 103 and MS 105, the base stations represented for example by the one base transceiver system (BTS) 113, and the base station controller (BSC) 115. A typical access provider network 110 includes a number of such RNs, although only one is shown for discussion purposes. Each RN serves as the "home" network for some mobile stations (e.g., MS 103) and provides roaming service for mobile stations (not shown) of customers that visit the geographic area served by the RN.

Each mobile station constitutes an interface between the mobile subscriber (or user) and the base station. Besides voice communications, the mobile station provides control and signaling functions. The mobile station is able to tune, under system command, to a logical channel in the frequency spectrum allocated to the system. Each logical channel comprises a pair of channels for two-way communications. Power levels of the transmitter can also be controlled by the system.

BTS 113 is the part of RN 111 that sends and receives RF signals to/from the mobile stations (e.g., MS 103) it currently serves. BTS 113 contains the antenna systems, towers, transmitters, and receivers at a site. BTS 113 is responsible for the control, monitoring, and supervision of calls made to and from each mobile station within its serving area. BTS 113 assigns and reassigns channels to the mobile stations and monitors the signal levels to recommend hand-offs to other BTSs (not shown).

BSC 115 is a centralized processor that controls the functions of a number of the BTSs (e.g., BTS 113) and helps to manage how calls made by each mobile station are transferred (or "handed-off") from one serving BTS to another. Each wireless network equipment vender implements this function differently. Some vendors have a physical entity, which they call a BSC, while other vendors include this functionality as part of their mobile switching center (MSC). For convenience of illustration, BSC 115 is shown associated with or incorporated into MSC 117.

The network 110 also includes a packet data serving node (PDSN) 119, which is a fixed network element introduced in the architecture for 3G networks to support packet data services. The interface between one or more of the CDMA2000-1x radio networks and a PDSN is called a R-P Interface. In the preferred embodiment, PDSN 119 supports Simple IP and Mobile IP addressing. PDSN 119 establishes, maintains and terminates logical links to the associated radio network, in this case RN 111, across the R-P interface. PDSN 119 also supports PPP sessions with mobile stations, such as MS 103.

PDSN 119 initiates Authentication, Authorization and Accounting (AAA) communications for the mobile station client to a home AAA server 121. Home AAA server 121 is also referred to as a remote authentication dial-in user service (RADIUS) server. PDSN 119 receives service parameters for MS 103, as a mobile client, from the AAA server 121. PDSN 119 also collects usage data for accounting purposes, which it relays to AAA server 121. PDSN 119 also is the network element that routes packets to/from external packet data networks, for example through a network service provider 123 to and from the Internet. Network service provider 123 may be an Internet Service Provider (ISP), in this case for the home service of MS 103. Alternatively, the network shown at 123 may coincide with or connect to a private data network or "Intranet" to which the particular customer has secure access. Although shown as a separate link for convenience, the PDSN 119 typically communicates with the AAA server 121 and with the ISP network 123 via a private IP network, such as the network 171.

The "visited" access provider network 150 includes physical radio networks, such as RN 151 of FIG. 1. RN 151 comprises at least one BTS 153 and BSC 155 for wireless communications with mobile stations, which are substantially the same in the illustrative embodiment as BTS 113 and BSC 117 of RN 111. RN 151 also includes a MSC-157, which is similar to MSC 117 in RN 111. RN 151 serves as the "home" network for some mobile stations (not shown) and provides roaming service for customers that visit the geographic area served by the access provides network 150, such as MS 105.

The access provider network 150 also includes a PDSN 159 and an AAA server 161, similar to those in network 110. For stations "homed" on RN 151, PDSN 159 acts as a home agent (HA) for packet service, and PDSN 159 interacts with an AAA server 161 in a manner analogous to that described above with regard to PDSN 119 and AAA server 121. However, for the roaming MS 105, PDSN 159 acts as a foreign agent (FA), and server 161 acts as a visited AAA server.

AAA servers are used for authentication, authorization and accounting functions for packet data calls in a CDMA2000-1x network. Both access provider networks 110 and 150 include one or more of such AAA servers (i.e., servers 121 and 161, respectively) and there may be one or more third party trusted AAA servers 141 that serve as proxies for communications between AAA servers of different access providers. The AAA servers provide authentication for both Simple IP and Mobile IP. These servers authorize service subscriptions, service profiles, and customized services. These servers also perform a variety of accounting functions, including starting an accounting record, maintaining an interim accounting record, and stopping an accounting record for a packet data communication service.

In the preferred implementation of the network 100, all authentication, authorization and accounting transactions are performed using a RADIUS protocol of the IS-835 Standard. The RADIUS protocol has been in use for many years and is used widely in ISP networks. In the access provider network 110, RADIUS is implemented only as client-server in which PDSN 119 acts as the client and AAA 121 acts as the server. Similarly, in the access provider network 150, RADIUS is implemented only as client-server in which the PDSN 159 acts as the client and AAA 161 acts as the server. Otherwise, the term "client" or "client device" may be used to refer to a mobile station or similar device, as indicated variously herein.

During registration of roaming subscribers, it becomes necessary to conduct certain transactions between AAA servers 121 and 161. These communications may be conducted directly via the IP network 171 or the like. In many cases, however, the AAA server 121 or 161 in each respective network 110 or 150 will communicate via the IP network 171, with the secure broker server 141 acting as a AAA proxy server. The IP network 171 could be a public network, such as a portion of the public Internet. However, because of the mission-critical nature of the AAA communications and the security and finance-related issues involved in such communications, the IP network 171 preferably is a secure packet communication network operated by one or more carriers or their trusted service providers.

The mobile stations are provisioned to normally operate in the serving area of one wireless system operated by the user's access service provider, and this radio system is referred to as the "home" location or system. In our example, RN 111 within the access provider network 110 is provisioned as the "home" system for both of the exemplary mobile stations 103 and 105. Within the access provider network 110 providing the "home" service for MS 103 and MS 105 is a Home Location Register (HLR) 125 that stores subscriber packet data subscription service options and terminal capabilities, i.e., regarding subscription to CDMA2000-1x, IS-95, voice, packet data, dual mode, dual service voice and packet data. The home RN 111 uses the service information from the HLR 125 to provide the subscribed services to each user's mobile station, for example while the MS 103 is operating in the service area of the home RN 111. Although not shown, the access provider network 150 typically may include one or more additional servers for storing similar HLR service information for mobile stations homed to radio networks, such as RN 151, of that access network 150. All radio networks of one access provider network may utilize one server for the HLR function.

As shown, the customer using MS 105 has roamed into the service area of the visited access provider network 150. For MS 105, service information is downloaded from the HLR 125 to the Visitor Location Register (VLR) 165 in visited access network 150 during a successful registration process. Specifically, the visited wireless communication network 150 assigns a register in server 165, as a VLR, to a mobile station, in this case MS 105, during a period when the mobile station roams into the wireless serving area of the network 150 and remains registered on that visited system. By doing so, proper services to roaming MS 105 are provided.

VLR 165 communicates with HLR 125 to authenticate MS 105 and to obtain a copy of MS 105's subscriber subscription service information, including packet data service information, from the HLR during the registration process. Typically, this is accomplished by packet message exchange via a SS7 interoffice signaling network 173. This communication is analogous to roaming registration authentication conducted today in both analog and digital cellular communication networks, although the communication here includes the extra information relating to the subscriber's packet data service.

Subsequently, when the subscriber using MS 105 initiates a packet data session, BSC 155 first goes to VLR 165 via the MSC 157 to check subscriber subscription information prior to granting the service to the subscriber. If the mobile station is not yet registered, this would initiate the registration procedure. However, if registration has been completed when the subscriber attempts the packet data communication, VLR 165 provides the requisite authorization based on checking the downloaded subscriber subscription information, and then allows communications to go to PDSN 159 for further processing specifically related to the data services. Although not shown, network 110 typically includes a similar VLR functionality.

The home access provider network 110 also includes a short message service center (SMSC) 127. The SMSC receives messages, such as e-mail, intended for transmission to mobile stations and forwards them to the appropriate MSC 117 or 157. The SMSC 127 receives the messages over an IP network, such as network 171 or the Internet. The links to the MSCs typically go through an SS7 network such as that shown at 173, although the link to the MSC 117 is shown separately for convenience. A similar SMSC server or control computer (not shown) may be provided in the visited access provider network 150 to allow that provider to offer short message service (SMS) to subscribers whose stations are assigned to home systems 151 within network 150. The SMSC 127 is a standard messaging computer used in cellular networks today to offer SMS services to cellular customers. Such SMSCs 127 will provide similar services to the newer mobile stations that also support the packet data services.

As another example, assume that the MS 105 has roamed across a PDSN boundary from network 110 to network 150 using a SIP service. Although originally assigned an address via PDSN 119, MS 105 will obtain packet data services via PDSN 159. As it roams across the boundary, the MS 105 must obtain a "care-of address" (COA) from a local "Foreign Agent" (FA), and register this COA with it's "Home Agent" (HA) on the home network. Although other control nodes or servers may perform these Agent functions, in the illustrative embodiment the PDSNs 119 and 159 serve as these Agents. The COA address allows the HA PDSN 119 to route packets with the assigned mobile IP address through the FA PDSN 159 to the visited RN 151, and hence, to the roaming MS 105.

In this example, PDSN 119, acting as the HA, subsequently intercepts all incoming traffic for mobile station 105 and forwards it to the mobile station at its new COA, that is to say via the PDSN 159. Outgoing traffic from the mobile station 105 is typically addressed as normal and routed directly from the PDSN 159 to the destination "correspondent node" (CN) from the "foreign" network. This routing path (CN=>HA=>MS=>CN) is referred to as "triangular routing". An option is for a "reverse tunnel" to be established between the FA and HA, so that all outgoing traffic from the mobile station 105 appears to originate on its home network 110. This behavior is described in *IP Mobility Support*, Network Working Group Request for Comments; 2002 Category: Standards Track, C. Perkins (Editor), IBM Corporation, October 1996 ("RFC2002") and the SIP messaging requirements for CDMA2000 are specified within the IS-835 Standard.

The authentication of MIP nodes is achieved using authentication extensions to the MIP registration traffic. Three extensions are used to authenticate a mobile extension; the FA challenge extension, the mobile station to HA extension, and the mobile station to home AAA extension. A new and unique FA challenge value is passed to the mobile station from the FA PDSN 159 each time that the MS 105 registers, as a defense against a malicious mobile station hijacking a MIP session. The mobile station to HA extension is derived from a 128 bit secret key known only to the mobile station and it's HA. The mobile station to home AAA extension is derived from a 128 bit secret key known only to the MS 105 and it's home AAA server 121.

MS 105 is able to maintain a static IP address even for hand-off between radio networks connected to separate PDSN nodes, such as RNs 111 and 151 and PSDNs 119 and 159. Therefore, Mobile IP provides hand-off capability, and enables MS 105 to roam in the public IP network, rather than just within the footprint of its home access provider. Mobile IP may be important for subscribers who are served around PDSN border areas.

The key distribution techniques may utilize any appropriate hardware for the client and server systems. In the network discussed above, the clients would typically be the portable digital terminals (e.g., mobile stations). Preferred embodiments of the server systems utilize general purpose computers in the form of servers or host computers or in the form of personal computers (PCs). Some of the client devices also may be PCs with Internet connectivity or similar general purpose computers with wireless data network communications capabilities. It is presumed that readers are familiar with the structure and operation of these various electronic devices. However, for completeness, it may be helpful to provide a summary discussion here of a mobile station and of certain of the general purpose computers.

Figure 2A:
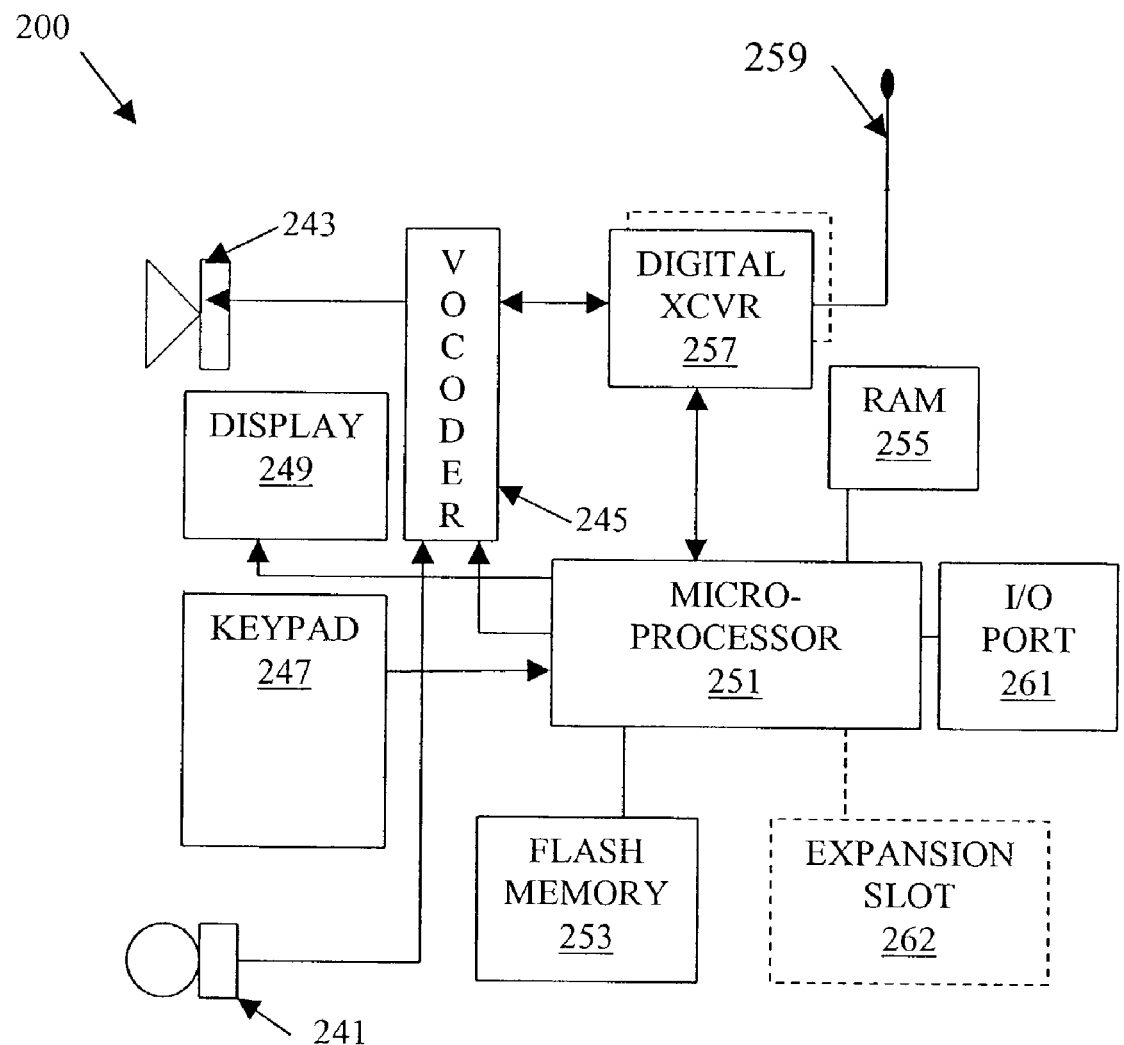
FIG. 2A and FIG. 2B are block diagrams of a mobile station used in the network of FIG. 1.
Figure 2B:
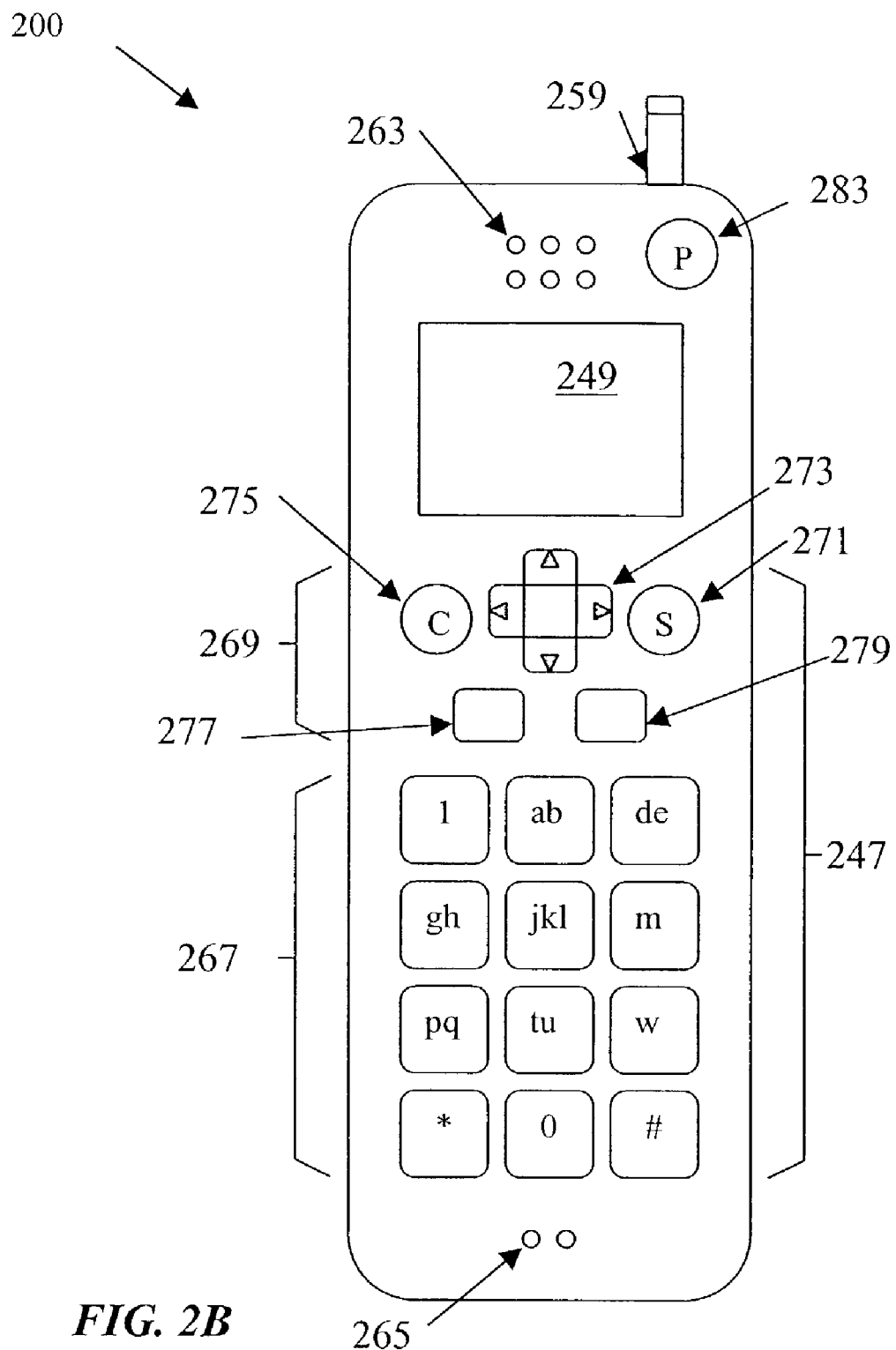

FIG. 2A is a functional block diagram of a simple mobile communication device or station 200 for use in the network of FIG. 1. FIG. 2B (shown later) is a plan view of the front of one exemplary embodiment of such a device. Although device 200 may be incorporated into a vehicle mounted mobile unit or into another device, such as a portable personal computer, for discussion purposes the illustrations show the station in the form of a handset, such as MS 103, 105 of FIG. 1.

MS 200 functions as a normal digital wireless telephone station. For that function, MS 200 includes a microphone 241 for audio signal input and a speaker 243 for audio signal output. The microphone 241 and speaker 243 connect to voice coding and decoding circuitry (i.e., vocoder) 245. For a voice telephone call, for example, the vocoder 245 provides two-way conversion between analog audio signals representing speech or other audio and digital samples at a compressed bit rate compatible with the digital protocol of the wireless telephone network communications.

For digital wireless communications, MS 200 also includes a digital transceiver (XCVR) 257. The invention encompasses embodiments utilizing any digital transceivers that conform to current or future developed digital wireless communication standards. For example, the transceiver 257 could be a TDMA or GSM unit, designed for cellular or PCS operation. In the preferred embodiments, the digital transceiver 257 is a CDMA transceiver that complies with the 1xRTT Standard and is capable of operating via the network of FIG. 1. The transceiver 257 provides two-way wireless communication of information, such as vocoded speech samples and digital message information. The transceiver 257 connects through RF send and receive amplifiers (known in the art and not separately shown) to an antenna 259. MS 200 may include one or more additional transceivers, as shown in dotted line form, for operation in an analog mode or in accord with an alternative digital standard.

As shown, MS 200 includes a display 249 for displaying messages, a menu generated by a client browser program, call related information, dialed and calling party numbers, and so on. A keypad 247 enables dialing digits for voice and/or data calls and generating selection inputs keyed by the user based on the displayed menu.

A microprocessor 251 controls all operations of MS 200. The microprocessor 251 is a programmable device. MS 200 also includes a flash memory 253 alone or in combination with a read only memory (ROM) and/or a non-volatile random access memory (RAM) 255, for storing various software routines and mobile configuration settings, such as mobile identification number (MIN), and so on. In a present implementation, the random access memory (RAM) 255 stores an operating system, vocoder software, client browser software, device driver software, call processing software, and short message service software. The memories also store data, such as telephone numbers and other data input by the user via the keypad 247. The programming will also include the key update software, encryption software and decryption software; and the data storage will include storage of the necessary key(s). MS 200 may also include an optional expansion slot, to add memory elements or to add other user selected functional elements.

FIG. 2B shows a front view of MS 200 of FIG. 2A, in the form of a portable handset. As shown, the handset housing includes openings 263 enabling sound to emerge from the speaker 243, as well as openings 265 to allow input of sound to the microphone 241. MS 200 includes display screen 249 and also includes various keys making up the keypad 247. Keypad 247 typically includes at least two sets of keys 267, 269. The keys 267 represent dialing-input keys. Typically, each of the twelve keys 267 is imprinted with a number from 1 to 0, an asterisk or star (*) or a number sign (#). Each of the keys 267 numbered 2 through 9 also is imprinted with three or four letters, to enable input of alphabetical information.

Keys 269 are function keys. An exemplary set of function keys includes a menu scrolling key 273, a selection (SEL) key 271, a clear (CLR) entry key 275, a send (SND) key 277 and an END key 279. The send (SND) key 277 is used to initiate or answer a wireless call, and the "END" key 279 is used to terminate a wireless call. Although other keys with other functions and/or labels may be used in place of or in addition to those shown, FIG. 2B shows three function keys for input of information to and retrieval of information from the processor and memory of the handset and/or selection of features from a menu shown on display 249. One of these keys is the two-way scrolling key 273, for controlling up and down movement of a displayed cursor or highlight function and attendant scrolling of menus shown on the display 249. The exemplary keys also include the selection (SEL) key 271, which enables a user to select an option indicated by the cursor or highlighting. The clear (CLR) key 275 enables the user to erase a selection. A wide variety of other cursor controls and selection inputs could be used.

The user operates a power (P) key 283 to toggle the MS 200 on and off. The keypad 247 supplies user input information to the microprocessor 251, and the microprocessor provides digital data signals to cause the display to show appropriate information to the user. Under control of the microprocessor 251, the display 249 shows textual information, such as dialed numbers and name and number information regarding stored speed dialing lists. The display 249 also may have certain specialized indicators, such as a message-waiting indicator and various roaming or home service indicators. Hence, under control of the microprocessor 251 and its programming, the keypad 247 and the display 249 provide a user interface allowing the customer to input information and receive information.

To make a routine telephone call, for example, a user dials in the destination number by actuating the appropriate ones of the number keys 267 and then pushes the send (SND) key 277. As the user presses the number keys, the microprocessor 251 causes the screen 49 to display the dialed number. When it senses the actuation of the send (SND) key 277, the microprocessor 251 generates a call request message in the appropriate protocol. This message includes the dialed destination number. The microprocessor 251 causes the digital transceiver 257 to send the message, as a signaling message, for example over the signaling channel of the particular wireless air-interface to a base station, for call set-up processing by the network 100.

The user interface through the keypad 247 and the display 249 also allow the user to input and receive data, which the MS 200 may communicate through the network (see FIG. 1)

using the digital transceiver 257. MS 200 also includes an I/O port 261 coupled to the microprocessor 251, to allow exchange of data between the microprocessor and an external data device. Through this port, the MS may serve as a data modem for an attached device, such as a laptop computer or a personal digital assistant. As a result, the MS 200 can provide mobile access to data communications services available from the wireless network. Similar communications are utilized for authorization and provisioning, for example, to download keys to the MS 200 and to download various service and/or feature activation data and/or programming.

Figure 3A:
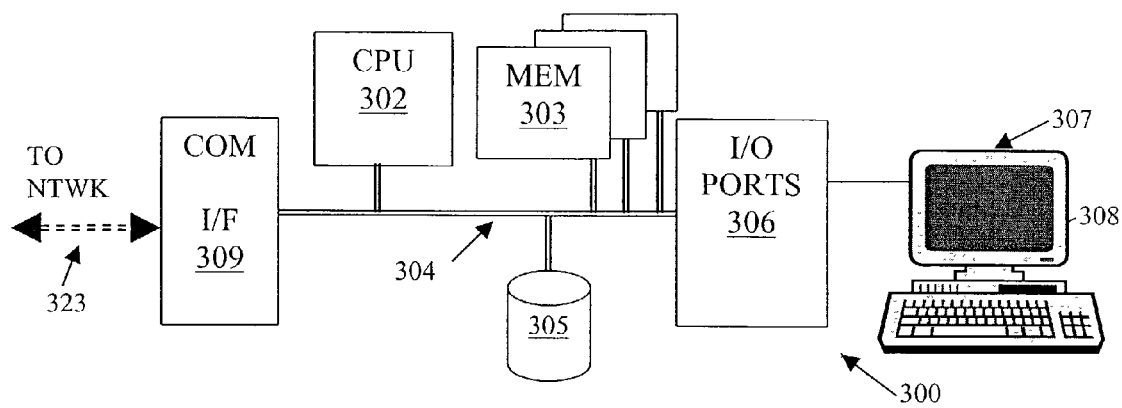
FIG. 3A is a functional block diagram of a personal computer or workstation useful in the network of FIG. 1.

FIG. 3A is a functional block diagram of a PC or workstation implementation of a system 300 that may serve as a distribution system or as an alternate client device. The exemplary computer system 300 contains a central processing unit (CPU) 302, memories 303 and an interconnect bus 304. The CPU 302 may contain a single microprocessor, or may contain a plurality of microprocessors for configuring the computer system 302 as a multi-processor system. The memories 303 include a main memory, a read only memory, and mass storage devices such as various disk drives, tape drives, etc. The main memory typically includes dynamic random access memory (DRAM) and high-speed cache memory. In operation, the main memory stores at least portions of instructions and data for execution by the CPU 302.

The mass storage may include one or more magnetic disk or tape drives or optical disk drives, for storing data and instructions for use by CPU 302. For a home PC, for example, at least one mass storage system 305 in the form of a disk drive or tape drive, stores the operating system and application software and well as data, including received messages and documents. The mass storage 305 within the computer system 300 may also include one or more drives for various portable media, such as a floppy disk, a compact disc read only memory (CD-ROM), or an integrated circuit non-volatile memory adapter (i.e. PC-MCIA adapter) to input and output data and code to and from the computer system 300.

The system 300 also includes one or more input/output interfaces for communications, shown by way of example as an interface 309 for data communications via the network. The interface 309 may be a modem, an Ethernet card or any other appropriate data communications device. The physical communication links may be optical, wired, or wireless (e.g., via satellite or cellular network).

The computer system 300 may further include appropriate input/output ports 306 for interconnection with a display 307 and a keyboard 308 serving as the respective user interface. For example, the computer may include a graphics subsystem to drive the output display 307. The output display 307 may include a cathode ray tube (CRT) display or liquid crystal display (LCD). Although not shown, the PC type system typically would include a port for connection to a printer. The input control devices for such an implementation of the system 300 would include the keyboard 308 for inputting alphanumeric and other key information. The input control devices for the system may further include a cursor control device (not shown), such as a mouse, a trackball, stylus, or cursor direction keys. The links of the peripherals 307, 308 to the system 300 may be wired connections or use wireless communications.

Each computer system 300 runs a variety of applications programs and stores data, enabling one or more interactions via the user interface, provided through elements such as 307 and 308, and/or over the network 323 to implement the desired processing for the estimation service or the processing of requests for promotional services. The customer computer, for example, runs a general purpose browser application and/or a separate e-mail program, and may run a program for mutual authentication and key distribution in the manner discussed herein.

Figure 3B:
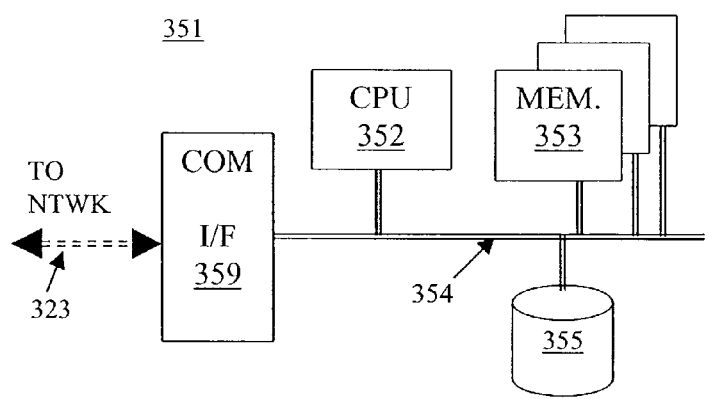
FIG. 3B is a functional block diagram of a general purpose computer system useful in the communications network of FIG. 1.

FIG. 3B is a functional block diagram of a general purpose computer system 351, which may perform the functions of the AAA server, the HLR or the like of FIG. 1. The exemplary computer system 351 contains a central processing unit (CPU) 352, memories 353 and an interconnect bus 354. The CPU 352 may contain a single microprocessor, or may contain a plurality of microprocessors for configuring the computer system 351 as a multi-processor system. The memories 353 include a main memory, a read only memory, and mass storage devices such as various disk drives, tape drives, etc. The main memory typically includes dynamic random access memory (DRAM) and high-speed cache memory. In operation, the main memory stores at least portions of instructions and data for execution by the CPU 352.

The mass storage may include one or more magnetic disk or tape drives or optical disk drives, for storing data and instructions for use by CPU 352. At least one mass storage system 355, preferably in the form of a disk drive or tape drive, stores the database used for the key management and distribution. The mass storage 355 may also include one or more drives for various portable media, such as a floppy disk, a compact disc read only memory (CD-ROM), or an integrated circuit non-volatile memory adapter (i.e. PC-MCIA adapter) to input and output data and code to and from the computer system 351.

System 351 also includes one or more input/output interfaces for communications, shown by way of example as an interface 359 for data communications via the network 323. The interface 359 may be a modem, an Ethernet card or any other appropriate data communications device. To perform the AAA functions and attendant key authentication, the interface 359 preferably provides a relatively high-speed link to the network. The physical communication link may be optical, wired, or wireless (e.g., via satellite or cellular network). Alternatively, the computer system may comprise a mainframe or other type of host computer system capable of web-based communications via a network 323 such as the Internet.

Although not shown, system 351 may further include appropriate input/output ports for interconnection with a local display and a keyboard or the like serving as a local user interface for programming purposes. Alternatively, the server operations personnel may interact with system 351 for control and programming of the system from remote terminal devices via network 323, e.g., the Internet or some other network link.

Computer system 351 runs a variety of applications programs and stores associated data in database 355. One or more such applications enable the receipt and delivery of the messages to enable operation as the appropriate server, for implementation of server functions relating to AAA and/or the MIP key update service, as will be discussed in more detail below.

The components contained in the computer systems 300 and 351 are those typically found in general purpose computer systems used as servers, workstations, personal computers, network terminals, and the like. In fact, these components are intended to represent a broad category of such computer components that are well known in the art. Certain aspects of the invention relate to the software elements, such as the executable code and database for the server functions of the key update techniques and/or the client functions of the PC 300 or the mobile station of FIG. 2A and FIG. 2B. The inventive concepts relate to methods, networks and systems (client and/or server) for implementing the key distribution techniques. Other aspects of relate to unique software products for implementing the inventive key distribution techniques. A software product includes at least one computer or machine-readable medium and information carried by the medium. The information carried by the medium may be executable code, software (including the software identified above), one or more databases and/or information regarding the keys.

A computer readable medium, as used herein, may be any physical element or carrier wave, which can bear instructions or code for performing a sequence of steps in a machine-readable form or associated data. Examples of physical forms of such media include floppy disks, flexible disks, hard disks, magnetic tape, any other magnetic medium, a CD-ROM, any other optical medium, a RAM, a ROM, a PROM, an EPROM, a FLASH-EPROM, any other memory chip or cartridge, as well as media bearing the software in a scannable format. A carrier wave type of medium is any type of signal that may carry digital information representative of the data or the instructions or code for performing the sequence of steps. Such a carrier wave may be received via a wireline or fiber-optic network, via a modem, or as a radio-frequency or infrared signal, or any other type of signal which a computer or the like may receive and decode.

At different times all or portions of the executable code or database for any or all of these software elements may reside in physical media or be carried by electromagnetic media or be transported via a variety of different media to program the particular system. Physical media include the memory of the computer processing systems 300, 351, such as various semiconductor memories, tape drives, disc drives and the like of general-purpose computer systems, or of the mobile station 200 of FIG. 2A and FIG. 2B. All or portions of the software may at times be communicated through the Internet and/or various other telecommunication networks shown in FIG. 1. Thus, another type of media that may bear the software elements includes optical, electrical and electromagnetic waves, such as used across physical interfaces between local devices, through wired and optical landline networks and over various air-links.

I. Dynamic Mobile IP Key Update (DMU)

A dynamic mobile IP key update (DMU) procedure in accordance with an embodiment provides a secure and efficient mechanism for distributing and updating mobile IP (MIP) cryptographic keys in CDMA2000 1xRTT (1X) and 1xEV-DO networks. The DMU procedure (or process) occurs at the IP layer directly between a MIP mobile node (MN) (i.e., mobile station) and RADIUS or DIAMETER AAA server 121. This procedure may be implemented as an add-on to the existing TR-45 IS-835/3GPP2 P.S0001-A-1 Standard, as an example.

In the preferred form, the DMU procedure utilizes well known RSA public key cryptography to securely distribute unique MIP keys to potentially millions of CDMA2000 1X and 1xEV-DO MNs using the same RSA public key. By leveraging the existing CDMA2000 1X authentication process, the DMU procedure employs a shared mutual authentication mechanism in which device-to-network authentication is facilitated using CDMA2000 1X challenge-response authentication, and network-to-device authentication is facilitated using RSA encryption. By utilizing RSA encryption, the MN (or MN manufacturer) is able to pre-generate MIP keys (and the challenge handshake authentication protocol (CHAP) key) and pre-encrypt the MIP keys prior to initiation of the DMU procedure. By employing this pre-computation capability, the DMU procedure is an order of magnitude more efficient than Diffie-Hellman Key Exchange, as an example.

II. Basic Dynamic MIP Key Update Mechanism

The DMU procedure is basically an authentication and key distribution (AKD) protocol which is more easily understood by separately describing the mechanism's two primary functional goals: 1) encrypted key distribution and 2) shared mutual authentication.

1. RSA Encrypted Key Distribution—By utilizing RSA public key cryptography, millions of MNs can be pre-loaded with a common RSA public (i.e., encryption) key (e.g., by the MN manufacturer) while the associated RSA private (i.e., decryption) key is securely distributed from the MN manufacturer to each service provider. Alternatively, a service provider can generate its own RSA public/private key pair and only distribute the RSA public key to MN manufacturers for pre-loading of MNs, for example.

Figure 4A:
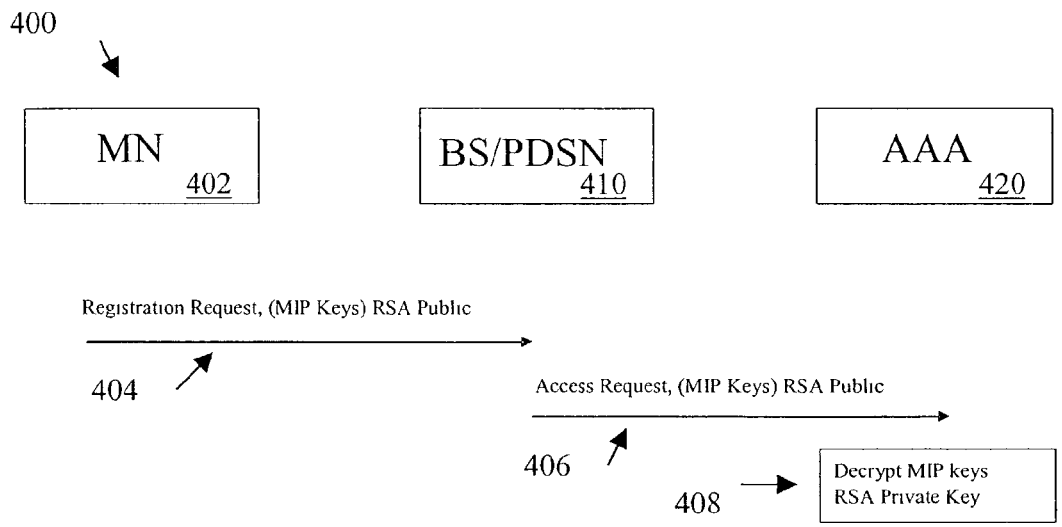
FIG. 4A is a flow diagram depicting RSA encrypted key distribution, in accordance with an embodiment.

FIG. 4A shows one process 400 for RSA encrypted key distribution. For a given mobile node 402, e.g., MS 103 or MS 105 of FIG. 1, during the manufacturing process, the MN manufacturer pre-loads each MN with the RSA public key. When the MN 402 is powered-up (or a client application is initiated), MN 402 pre-generates and encrypts MIP keys for distribution to home RADIUS AAA server 420 (e.g., home AAA 121). Alternatively, the MN manufacturer can pre-generate MIP keys, encrypt the MIP key payload, and pre-load the MN with multiple encrypted MIP key payloads to enable the DMU procedure.

During the initial registration process (or when the AAA server 420 requires MIP key update), the MN 402: 1) generates the appropriate MIP keys, CHAP key, and authentication information, 2) uses the embedded RSA public key to encrypt the payload information, 3) and appends the payload to a MIP Registration Request (RRQ), shown by arrow 404. A BS/PDSN 410 receives the RRQ from MN 402 and passes it to AAA server 420 as an Access Request (ARQ), shown by arrow 406. When the RADIUS AAA server 420 receives the encrypted payload (defined later as MIP_Key_Data), the AAA Server 420 uses the RSA private key to decrypt the payload and recover the MIP keys, shown by block 408.

2. Shared Mutual Authentication—Mutual authentication is achieved by delegation of the MN/device 402 authentication by the AAA server 420 to a CDMA2000 1x HLR (home location register)/AC (e.g., HLR 125, FIG. 1) while the MN 402 utilizes RSA encryption to authenticate the AAA Server 420 (e.g., server 121).

Figure 4B:
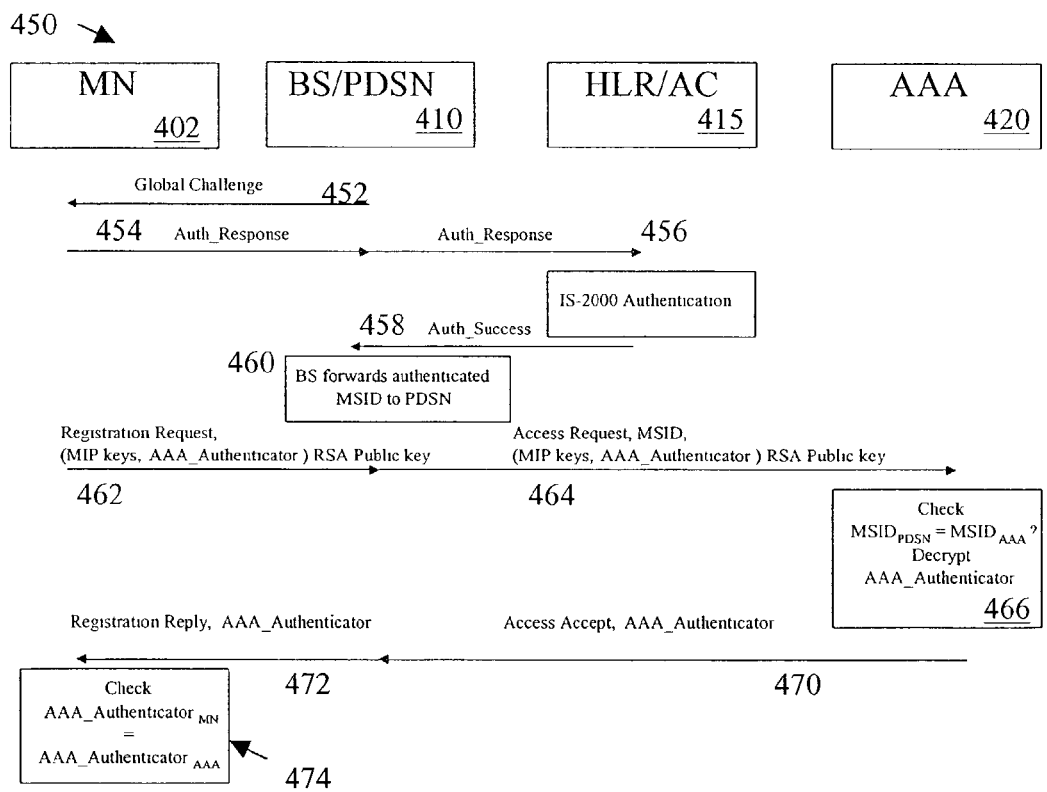
FIG. 4B is a flow diagram depicting shared mutual authentication, in accordance with an embodiment.

Referring to FIG. 4B, a process 450 of shared mutual authentication in accordance with the present invention is depicted. MN 402 authentication is based on the assumption that the MN (e.g., MS 103) has an existing authentication key (A-key) and shared secret data (SSD) with the CDMA2000 1x network 100 of FIG. 1. When MN 402 call origination occurs, the authentication center (AC) authenticates MN 402, depicted by arrows 452, 454, and 456. If authentication is successful, shown by arrow 458, the base station (e.g., BS 155) passes the MSID (e.g. MIN) to the PDSN (e.g., PDSN 159), as indicated in block 460. The "Authenticated MSID" is then included in the RRQ 462 and ARQ 464 message sent from the BS/PDSN 410 to the AAA server 420. Because the RADIUS AAA 420 stores the MSID associated with an MN subscription, the AAA server 420 is able to "authorize" MN access if the "Authenticated MSID" (i.e., $MSID_{PDSN}$) matches the RADIUS AAA MSID (i.e., $MSID_{AAA}$), as indicated in block 466. That is, the RADIUS AAA server 420 delegates its authentication function to the CDMA2000 1x HLR/AC 415 disposed between the BS/PSDN 410 and AAA server 420.

RADIUS AAA server 420 authentication (by MN 402) is enabled by including a random number (i.e., AAA_Authenticator) in the encrypted payload sent from MN 402 to the AAA Server 420, shown by arrows 462 and 464. Only the possessor of the proper RSA private key will have the ability to decrypt the payload and recover the unique AAA_Authenticator. If the MN 402 receives the correct AAA_Authenticator, returned by the AAA Server, as indicated by arrows 470 and 472, the MN 402 is assured that it is not interacting with a false base station. MN 402 knows the received AAA_Authenticator (i.e., $AAA\_Authenticator_{AAA}$) is correct if it matches the AAA_Authenticator of MN 402 (i.e., $AAA\_Authenticator_{MN}$), as indicated in block 474.

Because CDMA2000 1x authentication is not available in 1xEV-DO or a particular CDMA2000 1x network may not currently support A-key authentication, the DMU procedure also includes a random number (i.e., MN_Authenticator) generated by the MN 402 (and/or pre-loaded by the manufacturer), which enables the AAA server 420 to optionally authenticate MN 402 in 1xEV DO network only, as an example.

3. Encrypted One-Time Password Authentication—The DMU procedure can utilize a one-time client password, i.e., the MN_Authenticator, to support MN authentication in CDMA2000 1xEV-DO or whenever 1x RAN authentication (e.g. CAVE) is not available. The MN_Authenticator can be transmitted from the MN 402 to the home AAA Server 420 within the RSA-encrypted MIP_Key_Data payload to prevent interception and possible re-use by an attacker. Ideally, the MN_Authenticator is utilized as a one-time password, however, RSA encryption allows the MN_Authenticator to possibly be re-used based on each service provider's key distribution policy.

When the encrypted MIP keys are decrypted at the home AAA Server 420, the MN_Authenticator is also decrypted and compared with a copy of the MN_Authenticator stored within the AAA server 420. The home AAA server 420 receives a copy of the MN_Authenticator out-of-band (i.e., not using the 3GPP2 network) utilizing one of numerous possible methods outside the scope of the 3GPP2 Standard. For example, the MN_Authenticator may be: 1) read out by a point-of-sale provisioner from the MN 402, input into the subscriber profile, and delivered along with the NAI, via the billing/provisioning system to the home AAA server 420, 2) verbally communicated to a customer care representative via a call, or 3) input by the user interfacing with an interactive voice response (IVR) system that may be hosted by the access server and interfaced with wired or wireless telephone devices. In some embodiments, the MN_Authenticator may be delivered to an access server by a user or MN interacting with the access server via a world wide web or browser interface. The out-of-band MN_Authenticator delivery is purposely precluded from the standard to maximize the service provider's implementation flexibility.

It was possible for an unscrupulous provisioner or distribution employee to extract the MN_Authenticator prior to the DMU procedure, however the risk associated with such a disclosure is minimal. Because the 1xEV-DO MN does not transmit a device identifier during the initial registration process, an attacker, even with a stolen MN_Authenticator, cannot correlate the password with a particular MN 402 device or network access identifier (NAI), which is typically provisioned just prior to DMU procedure initiation.

III. Dynamic MIP Key Update Advantages Over OTASP

The DMU procedure has numerous advantages over the current over-the-air service provisioning (OTASP) procedure, including the below examples.

1) MIP key distribution occurs directly between the MN 402 and AAA Server 420 at the IP Layer. This approach eliminates the need for an interface between an over-the-air-function (OTAF) and AAA server.

2) The DMU procedure supports MIP key distribution for CDMA2000 1x and 1xEV-DO MN, unlike OTASP.

3) The DMU procedure facilitates MIP key distribution to a MN using relay-mode MS, unlike OTASP. For example, OTASP cannot deliver MIP keys to a laptop MN interfacing with a MS modem.

4) Pre-encryption of MIP_Key_Data allows the DMU procedure to be an order of magnitude faster than Diffie-Hellman Key Exchange.

5) The MN manufacturer can pre-generate MIP keys, pre-encrypt the MIP key payload, and pre-load the payload in an MN. Thus, an MN with limited processing power is never required to use RSA encryption. An OTASP device is always forced to perform computationally expensive exponentiations during the key update process.

6) The MN is protected against false BS denial-of-service (DOS) attacks, in which a false BS changes the MIP key for MNs in its vicinity. OTASP Diffie-Hellman Key Exchange is vulnerable to BS DOS attacks.

7) The DMU procedure utilizes mutual authentication; OTASP Diffie-Hellman Key Exchange does not utilize authentication.

IV. Detailed DMU Procedure Description

The Dynamic Mobile IP Update procedure is a secure, yet extremely efficient mechanism for distributing essential MIP cryptographic keys (e.g. MN-AAAh key and MN-HA key) and the Simple IP CHAP (or Challenge Handshake Authentication Protocol) key. The MN-AAAh key is the key for the home AAA (or AAAh) server 420 for the mobile node 402. The MN-HA indicates the mobile node home agent, e.g., HA 123 of FIG. 1. The DMU protocol enables pre-computation of the encrypted key material payload, known as MIP_Key_Data. The DMU procedure purposely avoids the use of Pubic Key Infrastructure (PKI) Certificates in order to greatly enhance the procedure's efficiency using MIP_Key_Data pre-encryption within the MN.

1. RSA Public Key Cryptography—In accordance with the present embodiment, RSA Public Key encryption and decryption is performed in accordance with RFC 2313, *PKCS #1: RSA Encryption Version 1.5*. The DMU procedure supports RSA with a 1024-bit modulus by default. The DMU procedure may also support 768-bit or 2048-bit RSA, depending on the MN 402 user's efficiency or security requirements. RSA computation speed-ups using low exponent RSA or the value "65537" are acceptable.

2. Other Public Key Algorithms—The DMU procedure does not preclude the use of other public key technologies. The DMU protocol includes a Public Key Type field that allows for definition of the type of encryption used.

3. Public Key Infrastructure (PKI)—The DMU procedure is designed to maximize the efficiency of Mobile IP (MIP) key distribution for CDMA2000 MNs. The use of a public key certificate would improve the flexibility of the MIP key update process by allowing a Certificate Authority (CA) to vouch for the RSA Public Key delivered to the MN 402. Unfortunately, the use of a Public Key Certificate would significantly reduce the efficiency (i.e., speed and overhead) of the MIP key update process. For instance, each MN must be pre-loaded with the CA's Public Key. During the MIP key distribution process, the network must first deliver its RSA Public Key (in a Certificate) to the MN. The MN must then use RSA to decrypt the Certificate's digital signature to verify that the presented RSA public key is legitimate. However, such a process significantly increases the number of exchanges, increases air interface overhead, increases the amount of MN computation, and slows the MIP key update process.

Aside from the operational efficiency issues, there are numerous policy and procedural issues that have previously hampered the deployment of PKI in commercial networks. On a more theoretical basis, PKI is likely unnecessary for a key distribution model in accordance with the present techniques. PKI is ideal for a many-to-many communications model, such as within the Internet where many different users interface with many different Web sites. However, in the cellular/PCS Packet Data environment, a many-to-one (or to-few) distribution model exists in which many users interface with one wireless carrier to establish their Mobile IP security associations (i.e., cryptographic keys).

4. Cryptographic Key Generation—The DMU process relies on each MN to randomly/pseudo-randomly generate the MN_AAAh key, MN_HA key, and Simple IP CHAP key. Preferably, each MN has the capability to generate random/pseudo-random numbers in accordance with the guidelines specified in Randomness Recommendations for Security, Network Working Group Request for Comments: 1750 Category: Informational, D. Eastlake, 3rd (Digital Equipment Corporation), S. Croker (Cybercash), S. Shiller (Massachusetts Institute of Technology), December 1994 ("RFC 1750"). Although it may be more secure for the network to generate cryptographic keys at the AAA server 420, client cryptographic key generation is acceptable due to the significant efficiency improvement in the update process via pre-generation and pre-encryption of the MIP keys. amended version thereof:

5. MIP_Key_Data Payload—MIP cryptographic keys (e.g., MN_AAAh key and MN_HA key) and the Simple IP CHAP key are encapsulated and encrypted into a MIP_Key_Data Payload, along with the AAA_Authenticator and MN_Authenticator. The MIP_Key_Data Payload is appended to the MN's MIP Registration Request (RRQ) as a MIP Vendor/Organization-Specific Extension (See IETF RFC 3115, *Mobile IP Vendor/Organization-Specific Extensions*). When the PDSN 410 converts the MIP RRQ to a RADIUS Access Request (ARQ) message, the MIP_Key_Data Payload is converted from a MIP Vendor/Organization-Specific Extension to a 3GPP2 Vendor Specific Radius Attribute.

Upon receipt of the ARQ, the RADIUS AAA 420 decrypts the MIP_Key_Data payload using the RSA private (decryption) key associated with the RSA public (encryption) key used to encrypt the MIP_Key_Data payload. The MIP_Key_Data is defined as follows:

MIP_Key_Data=RSA Pub_Key$_i$ [MN_AAAh key, MN_HA key, CHAP_key, MN_Authenticator, AAA_Authenticator], Public_Key_ID$_1$ Where:

MN_AAA key=128-bit random MN/AAA Server key (encrypted)

MN_HA key=128-bit random MN/Home Agent (HA) key (encrypted)

CHAP_key=128-bit random Simple IP authentication key (encrypted)

AAA_Authenticator=64-bit random number used by MN to authenticate AAA Server (encrypted)

MN_Authenticator=24-bit random number, displayed as 8 decimal digit number. To be used optionally in 1xEV DO network (encrypted)

Public Key Identifier (Pub_Key_ID)=PKOID, PKOI, Public_Key_Type, PK_Expansion_Field Where:

Public Key Organization Identifier (PKOID)=8-bit serial number identifier of Public Key Organization (PKO) that created the Public Key.

Public Key Organization Index (PKOI)=8-bit serial number used at PKO discretion to distinguish different Public/Private key pairs.

Public Key Type (Pub_Key_Type)=8-bit identifier of the algorithm used.

PK_Expansion=8-bit field to enable possible expansion of PKOID or PKOI fields.

Note: If 1024-bit RSA is used, the encrypted portion of the payload is 1024 bits (128 bytes) long. With the 4 byte Public Key Identifier, the total MIP_Key_Data payload is 132 bytes long.

6. RADIUS/DIAMETER AAA Server Support—In the preferred form, the RADIUS or DIAMETER AAA Server supports the DMU procedure. The AAA server 420 supports RSA Public key cryptography and maintains a database of RSA Private (decryption) keys indexed by the Public Key Identifier. The AAA server 420 has the ability to process and construct the 3GPP2 Vendor Specific Radius attributes specified herein, below. Delivery of the RSA private key(s) to AAA server 420 from the MN 402 manufacturer(s) may be accomplished in any of a variety of manners, such as via encrypted e-mail or physical (e.g., mail) delivery.

Figure 5A:
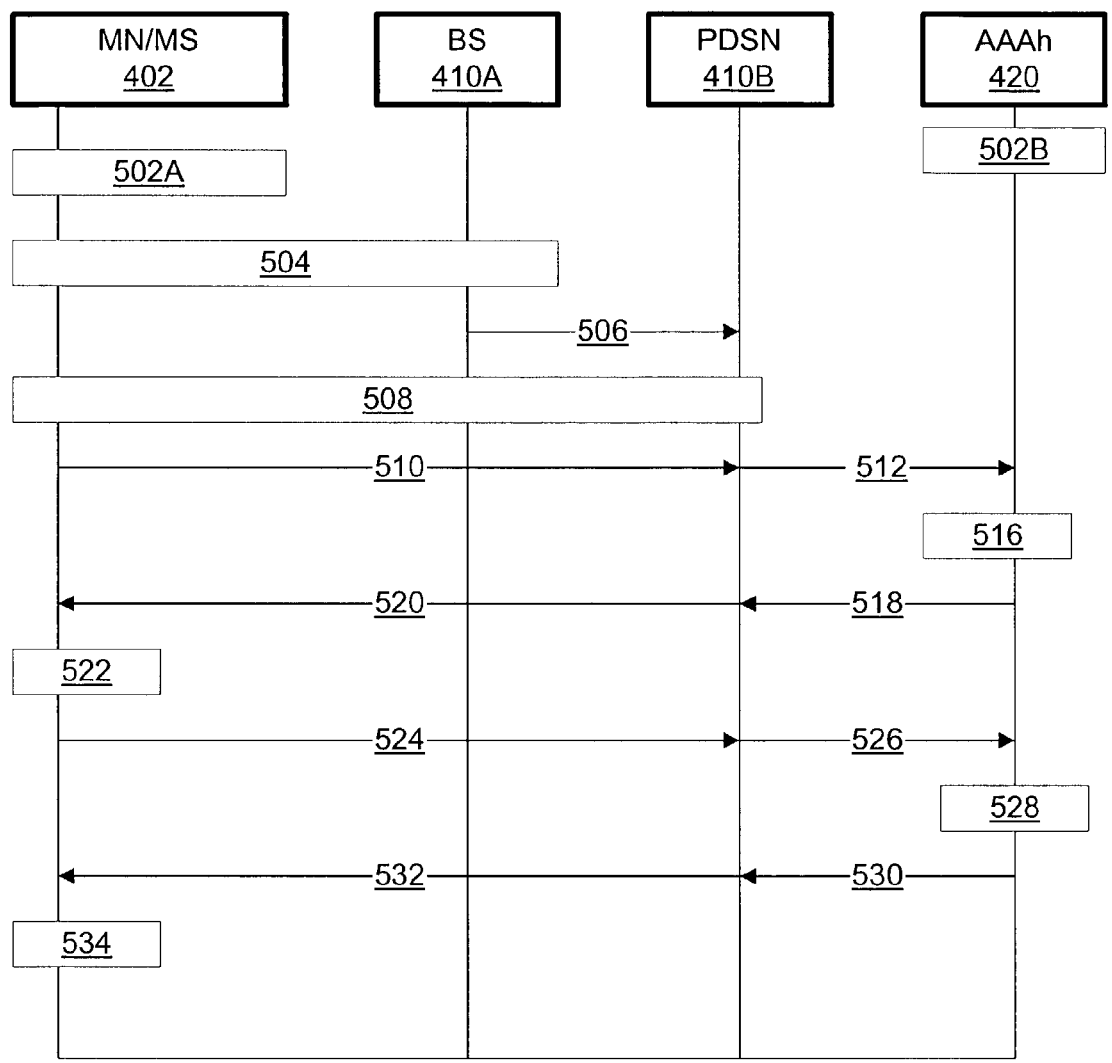
FIG. 5A is a flow diagram of a dynamic MIP update process in accordance with an embodiment.

7. DMU Procedure Network Flow—FIG. 5A provides a flow diagram 500 of the process flow for a DMU procedure within the context of an IS-2000 network. As a basic premise in this embodiment, it is assumed that each RSA Public/Private Key pair is generated in accordance with *PKCS #1: RSA Encryption Version 1.5*, Network Working Group Request for Comments: 2313 Category: Informational, B. Kaliski (RSA Laboratories East), © The Internet Society, March 1998 ("RFC 2313") and each Public/Private key pair is assigned a unique Public Key Identifier (PKOID) by its creator. The base station and PSDN combination 410 of FIG. 4A have been represented independently as BS 410A and PDSN 410B in FIG. 4B for clarification.

In step 502A, the public key is pre-loaded on the MN(s)/MS(s). If the service provider does not generate the Public/Private Key pair and deliver the RSA Public Key to the MN 402 (or MN/MS) manufacturer for pre-installation in the MN, the MN manufacturer generates the RSA Public/Private Key pair (e.g., using a 1024-bit modulus) and pre-loads all MNs with the RSA Public (i.e., encryption) key. The MN manufacturer distributes the RSA Private (i.e., decryption) key, in a secure manner, to the appropriate service provider(s) for pre-loading on the AAA server 420, in step 502B. Generally, it may be acceptable for the MN manufacturer to distribute the same Private key to multiple service providers.

Assuming that the CDMA2000 1x MN 402 has been provisioned with an A-key and SSD, the CDMA2000 1x MN 402 initiates a call origination and authenticates message, in step 504, to the IS-2000 network 100. Upon CDMA2000 1x (CAVE) authentication success, the BS 410A sends the "authenticated" MSID (e.g. MIN) to the PDSN 410B, in step 506. In step 508, MN 402 and PDSN 410B establish a PPP session. In step 510, MN 402 sends a MIP Registration Request (RRQ) to PDSN 410B. PDSN 410B converts the MIP RRQ into a RADIUS ARQ message, includes the MSID in the ARQ and forwards the ARQ to the home AAA server 420, in step 512. AAA server 420 compares the authenticated MSID sent from the PDSN with the MSID in its subscriber database associated with the NAI. If, in step 514, the MIP_Update Bit is set, AAA server 420 rejects packet data access and orders a MIP key update, in step 516.

In step 518, AAA server 420 sends an Access Reject (i.e., code=3) message to PDSN 410B with MIP_Key_Update_Request 3GPP2-Specific Radius Attribute. PDSN 410B converts the Access Reject to a MIP Registration Reply (RR) with a MIP_Key_Request MIP Vendor/Organization-Specific Extension and sends the RR to MN 402, in step 520. In step 522, if MN 402 has not pre-generated and pre-encrypted the MIP_Key_Data payload, the MN generates the MN_AAA key, MN_HA key, CHAP key, MN_Authenticator extension, and AAA_Authenticator extension, in accordance with RFC 1750. Except for the Public Key Identifier, all generated values are encrypted using the pre-loaded RSA Public (i.e., encryption) key. The newly generated temporary MN_AAA$_{TEMP}$ key and MN_HA$_{TEMP}$ key are used to calculate the MN-AAA Authentication Extension and Mobile-Home Authentication Extension for the current RRQ. Note, MN 402 may pre-compute the MIP_Key_Data payload by checking whether a payload exists during each MN power-up or application initiation.

In step 524, MN 402 sends the RRQ with MIP_Key_Data MIP Vendor/Organization-Specific Extension (see RFC 3115) to the PDSN 410B. The PDSN, in step 526, converts the RRQ to a RADIUS ARQ with MIP_Key_Data 3GPP2 RADIUS Attribute and forwards the ARQ to the home AAA server 420. The MSID is included in the ARQ. The AAA server 420 compares the authenticated MSID (sent from the PDSN 410B) with the MSID in its subscriber database (associated with the NAI). In step 528, if MSID$_{PDSN}$=MSID$_{AAA}$, using the Public Key Identifier, the AAA server 420 determines the appropriate RSA Private key and decrypts the encrypted portion of the MIP_Key_Data payload. The AAA server 420 verifies the MN-AAA Authentication Extension using the decrypted MN_AAA key. If successful, the AAA server updates the subscriber profile with the decrypted MN_AAA key, MN_HA key, and CHAP key. AAA server 420 re-sets the MIP Update Bit.

AAA server 420 sends an Access Accept with AAA_Authenticator 3GPP2 RADIUS Attribute to the PDSN 410B, in step 530. PDSN 410 converts the Access Accept to a MIP RR with AAA_Authenticator MIP Vendor/Organization-Specific Extension, in step 532. If AAA_Authenticator$_{MN}$=AAA_Authenticator$_{AAA}$, MN 402 assigns MN_AAA$_{TEMP}$ to MN_AAA key and MN_HA$_{TEMP}$ to MN_HA key, in step 534. Otherwise, MN 402 discards the temporary keys. Note, IS-835 currently supports 3GPP2 RADIUS Vendor-Specific Attributes, but does not currently support Mobile IP Vendor/Organization-Specific Extensions.

Figure 5B:
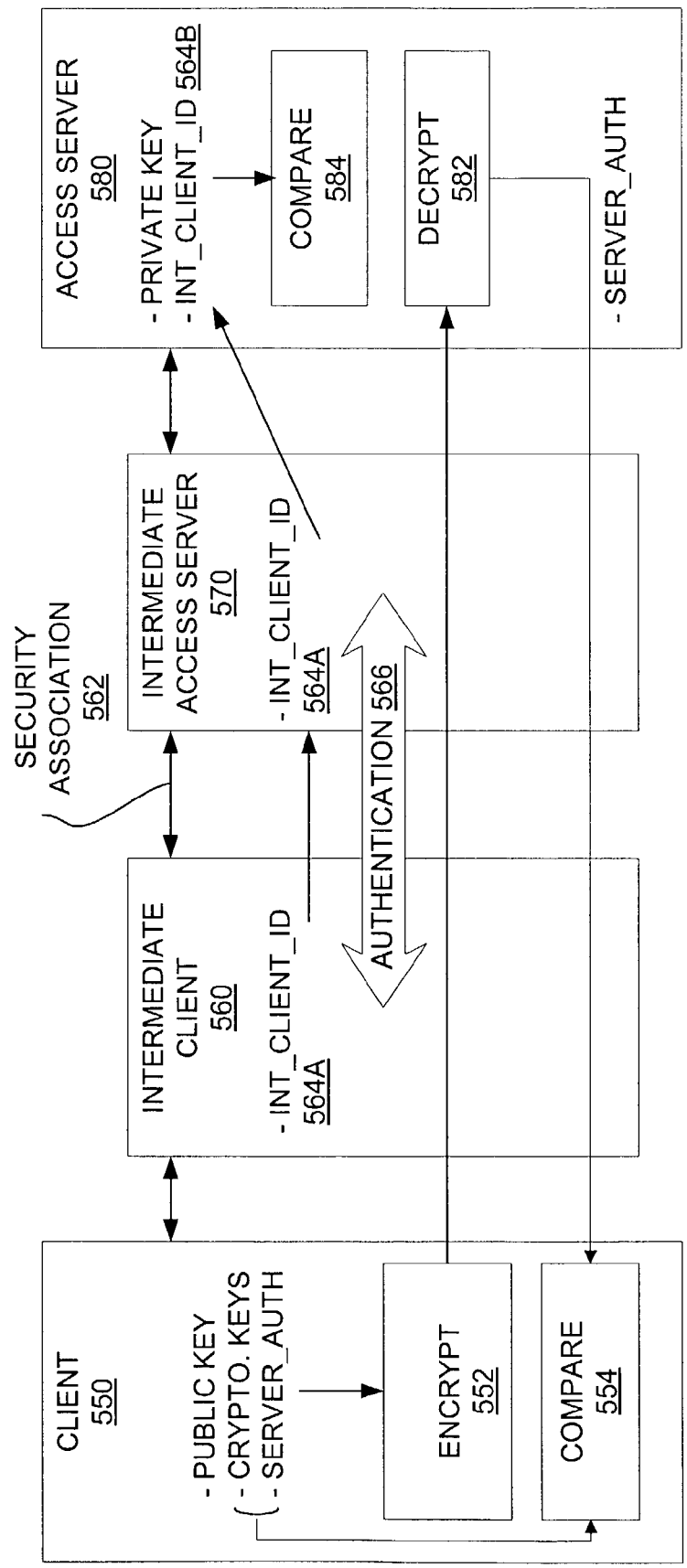
FIG. 5B is a diagram depicting shared mutual authentication and cryptographic key exchange using an intermediate client and an intermediate server, in accordance with an embodiment.

In FIG. 5B, an embodiment is shown wherein the architecture includes at least one intermediate client and at least one intermediate server disposed between the client device and access server. In such cases, the intermediate client may be a proxy for the client or some other type of device or system to which the client interfaces (e.g., a network or application server, access server, back-end system or application or front-end system or application). An intermediate server may be a proxy server for the access server or some other type of device or system to which the access server interfaces (e.g., a network or application server, access server, back-end system or application or front-end system or application). Or, the intermediate client and intermediate server may be two devices acting in a client-server relationship related to each other and disposed between the client device and access server. As another example, the intermediate access server may be an authentication center for a Radio Access Network.

In accordance with this embodiment, a system and method are provided for secure distribution of a set of cryptographic keys using shared mutual authentication. With reference to FIG. 5B, a public key and private key pair are generated, wherein the private key is stored the access server 580 and the client device 550 stores the public key. A security association 562 is established between an intermediate client device 560 and an intermediate access server 570. To facilitate authentication, an intermediate client identifier 564A representative of said intermediate client device 550 is associated with the intermediate access server 570, and stored at the access server 580 (represented as INT_CLIENT_ID 564B). A set of cryptographic keys and a server authenticator 556A are generated and stored at the client device 550. The set of cryptographic keys and the server authenticator 556A are encrypted 552 using the public key of the client device 550.

The intermediate access server 570 authenticates 566 the intermediate client device 560 as a function of the security association 562 using, for example, known authentication techniques. Or other, novel forms or authentication may be used. In one form, the authentication process may include storing the intermediate client identifier 564A at the intermediate access server 570 and verifying that the intermediate client identifier 564A received by the intermediate access server 570 corresponds to the intermediate client identifier 564A stored at the intermediate access server 570. If authentication is successful, the intermediate client identifier 564A is delivered to the access server 580. Also, the client device 550 delivers the encrypted set of cryptographic keys and server authenticator to the access server 580.

Access server 580 decrypts 582 the delivered set of cryptographic keys and server authenticator (as a decrypted server authenticator 556B) using the private key. The intermediate client identifier 564A delivered by intermediate access server 562 is compared 584 with the intermediate client identifier 564B stored at the access server 580. If both identifiers are the same, the access server 580 accepts the decrypted set of cryptographic keys and the decrypted server authenticator 556B is returned by the access server 580 to the client device 550. If both authenticators are not the same, the process is aborted.

At the client device 550, the server authenticator 556B returned by access server 580 is compared 554 with the server authenticator 556A stored at the client device and, if both server authenticators are the same, the access server is authenticated and the set of cryptographic keys are accepted by the client device 550. In some embodiments, the client device and the intermediate client device may be the same entity or reside within the same device.

V. DMU Procedure Security Threat Assessment

The DMU procedure is designed to maximize the efficiency of MIP key distribution while providing adequate key distribution security. The following list provides a description of security considerations related to the DMU procedure.

1. Cryptographic Key Generation by the MN—Because, in the preferred embodiment, the MN generates the MN_AAA, MN_HA, and CHAP keys, the MN is configured to perform cryptographic key generation in accordance with accepted random/pseudo-random number generation procedures. In the preferred form, the MN complies with RFC 1750 guidelines.

2. Man-in-the-Middle (MIM) Attack—Currently, the risk of an MIM attack is minimal due to the required expertise, attack expense, and impending CDMA2000 1x mutual authentication protection. If a particular CDMA2000 1x network does not support A-key authentication, the MN_Authenticator may optionally be used.

3. RSA Private Key Compromise—Because one RSA Private key may be associated with millions of MNs (via a RSA Public key), it is important to protect the RSA Private key from disclosure to unauthorized parties. Accordingly, each MN manufacturer implements adequate security procedures/policies regarding the dissemination of RSA Private keys. RSA Private keys should be distributed to legitimate CDMA2000 service providers only. An MN manufacturer may distribute the same RSA Private key to multiple service providers to enable MIP key update.

4. False Base Station/PDSN—The MN 402 is protected against a false BS denial-of-service (DOS) attack, since only the proper AAA server 420 can recover the AAA_Authenticator.

5. CDMA2000 1X False MN—The CDMA2000 1x network is adequately protected against a false MN 402 by IS-2000 challenge-response authentication.

6. 1xEV-DO False MN—The 1xEV-DO AAA server 420 may optionally authenticate MN 402 using the MN_Authenticator to prevent a fraudulent MN activation.

VI. Proposed IS-835 Annex C: RADIUS Attributes Annex Modifications

In accordance with the preferred embodiment, three new 3GPP2 RADIUS Attributes are required to support the DMU procedure and may, for example, be specified as follows:
Type: 26
Length: >9
3GPP2 Vendor ID: 5535
1. MIP_Key_Update_Request: The home RADIUS AAA server 420 indicates that a MIP key update is required.
  a) Vendor-Type=81
  b) Vendor-Length=6
  c) Vendor-Value=FF
2. MIP_Key_Data: The payload contains the encrypted MN_AAA key, MN_HA key, CHAP key, MN_Authenticator, and AAA_Authenticator. The payload also contains the Public Key Identifier.
  a) Vendor-Type=82
  b) Vendor-Length>=132
  c) Vendor-Value=128 byte RSA encryption payload (when 1024-bit RSA used) which contains encrypted MN_AAA key, MN_HA key, CHAP key, MN_Authenticator, and AAA_Authenticator. The four (4) byte Public Key Identifier is concatenated to the encrypted payload.
3. AAA_Authenticator: 64-bit AAA_Authenticator value decrypted by the home RADIUS AAA server 420.
  a) Vendor-Type=83
  b) Vendor-Length>=8 bytes
  c) Vendor-Value=decrypted AAA_Authenticator from home AAA server 420.

VII. Proposed IS-835 Annex E: 3GPP2 Mobile IP Vendor/Organization-Specific Extensions In the preferred form, three 3GPP2 Mobile IP Vendor/Organization-Specific Extensions (RFC 3115) are defined to support the DMU procedure. These may be appreciated with respect to the format 600 of FIG. 6A. According to format 600:
Type 602: 38 (CVSE-TYPE-NUMBER)
3GPP2 Vendor ID 604: 5535 (high-order octet is 0 and low order octets are the SMI Network Management Private Enterprise Code of the Vendor in the network byte order, as defined in RFC 1700).

The extensions are defined as follows:
1. MIP_Key_Request: The home RADIUS AAA server 420 indicates MIP key update is required.
  a) Length 606=7
  b) Vendor-CVSE-Type 608=1
  c) Vendor-CVSE-Value 610=FF
2. MIP_Key_Data: The payload contains encrypted MN_AAA key, MN_HA key, CHAP key, MN_Authenticator, and AAA_Authenticator. The payload also contains Public Key Identifier.
  a) Length 606>=138
  b) Vendor-CVSE-Type 608=2
  c) Vendor-CVSE-Value 610=128 byte RSA encryption payload (when 1024-bit RSA used) which contains encrypted MN_AAA key, MN_HA key, CHAP key, MN_Authenticator, and AAA_Authenticator. The four (4) byte Public Key Identifier is concatenated to the encrypted payload.
3. AAA_Authenticator: 64-bit AAA_Authenticator value decrypted by the home RADIUS AAA server 420.
  a) Length 606>=14 bytes
  b) Vendor-CVSE-Type 608=3
  c) Vendor-CVSE-Value 610=decrypted AAA_Authenticator from home RADIUS AAA server 420.

VIII. Proposed IS-835 Annex F: Public Key Identification (for Dynamic MIP Key Update)

The Public key identifier (Pub_Key_ID) is used only during the DMU procedure to allow the AAA server 420 to distinguish between different Public keys (which may be assigned by different manufacturers, service providers, or other organizations). A format 630 for the Public key identifier is shown in FIG. 6B.

Referring to FIG. 6B, each Public Key Organization (PKO) is assigned a Public Key Organization Identifier (PKOID) 632 to enable the AAA server 420 to distinguish between different Public keys created by different PKOs (see FIG. 7). If a service provider does not provide the MN 402 manufacturer with a (RSA) Public key, the manufacturer generates a unique RSA Public/Private key pair and pre-load each MN with the RSA Public key (1024-bit modulus by default). The manufacture may share the same RSA Private key with multiple service providers as long as reasonable security procedures are established and maintained (by the manufacturer) to prevent disclosure of the RSA Private (i.e., decryption) key to an unauthorized party.

A Public Key Organization Index (PKOI) 634 is an 8-bit field in which the index the value is defined at the discretion of the PKO. For example, a device manufacturer may incrementally assign a new PKOI for each Public/Private key pair when the pair created. A Pub_Key_Type field 636 allows for identification of the Public Key algorithm used (see FIG. 6C). And, an Expansion field 638 enables support for additional PKOs or expansion of the PKOI.

IX. CDMA2000 1xEV-DO Support

Because the DMU procedure occurs at the IP Layer, the DMU procedure supports MIP key distribution in either the CDMA2000 1x or 1xEV-DO network, in the preferred embodiment. Because the CDMA2000 1xEV-DO network does not provide Radio Access Network (RAN) authentication, the DMU procedure can be more susceptible to a false MN attack (i.e., than in an CDMA2000 1x network with CAVE RAN authentication). For this reason, the DMU procedure has the capability to optionally support device-to-network authentication using the MN_Authenticator.

The method of MN_Authenticator delivery to the RADIUS/DIAMETER AAA server 420 can be accomplished in any of a variety of manners, and is not addressed within the TR-45/3GPP2 Standard. Preferably, service providers are allowed the flexibility to determine the most efficient/least intrusive procedure to support MN authentication during the DMU procedure.

1. RADIUS/DIAMETER AAA Support—The RADIUS/DIAMETER AAA Server 420 supports three MN_Authenticator options:

a) Ignore MN_Authenticator—Depending on other potential authentication/fraud prevention options (outside the scope of the DMU procedure), the RADIUS/DIAMETER AAA server 420 may be configured to have the capability to ignore the MN_Authenticator. For example, when the AAA server 420 decrypts the MIP_Key_Data payload, the AAA server silently discards the MN_Authenticator.

b) Pre-Update Validation—Prior to updating a subscription profile with the delivered MIP keys, the AAA server 420 compares the MN_Authenticator$_{MN}$ (delivered via the encrypted MIP_Key_Data payload) with the MN_Authenticator$_{AAA}$, which may be delivered via the service provider customer care or billing/provisioning system.

c) Post-Update Validation—After the DMU procedure is complete, the AAA server 420 stores the delivered MN_Authenticator$_{MN}$ and waits for delivery of the MN_Authenticator$_{AAA}$, for example, via Customer Care, IVR, or some other unspecified process). Once the MN_Authenticator is delivered to the AAA server 420, the AAA server compares the MN_Authenticator$_{MN}$ (e.g., delivered via the encrypted MIP_Key_Data payload) with the MN_Authenticator$_{AAA}$. If the authenticators match, the AAA server 420 authorizes access and final update of the MIP keys.

2. MN Support—The MN stores the 24-bit MN_Authenticator and displays the MN_Authenticator as an 8 decimal digit number via, for example, a LCD display on a handset or via a GUI for a modem. If MN 402 resides within a handset, the user may display the MN_Authenticator using, as an example, the following keypad sequence: "FCN+*+*+M+I+P+RCL". Otherwise, the MN 402 displays the MN_Authenticator via the device's GUI.

The MN 402 has the capability to reset the MN_Authenticator. In other words, the MN 402 has the capability to randomly/pseudo-randomly generate a new 24-bit MN_Authenticator in accordance with RFC 1750 upon user command. The reset feature mitigates possible compromise of the MN_Authenticator during shipment/storage. If the MN 402 resides within a handset, the user may reset the MN_Authenticator using the following keypad sequence: "FCN+*+*+M+I+P+C+C+RCL", as an example. Otherwise, the MN 402 can reset the MN_Authenticator via the device's GUI.

The MN 402 manufacturer may pre-load the MN with the MN_Authenticator. For example, by pre-loading the MN_Authenticator and affixing a sticker with the MN_Authenticator (e.g., 8 decimal digit representation) to the MN (e.g. modem), the point-of-sale representative does not have to retrieve the MN_Authenticator from the MN interface.

MN 402 may maintain a separate primary and secondary queue of MN_Authenticator/MIP_Key_Data Payload pairs. When the MN user resets the primary MN_Authenticator, MN 402 discards the primary MN_Authenticator (and any associated MIP_Key_Data Payload) and assigns the MN_Authenticator in the secondary queue as the primary MN_Authenticator (and assigns any associated MIP_Key_Data Payloads to the primary queue). This feature enables the user/provisioner to reset the MN_Authenticator and immediately initiate the DMU procedure without losing the MIP_Key_Data Payload pre-encryption advantage. Upon MN_Authenticator transfer from the secondary to primary queue, the MN shall generate a new MN_Authenticator and associated MIP_Key_Data Payload for the secondary queue. The MN 402 checks both the primary and secondary MN_Authenticator/MIP_Key_Data Payload queues upon power-up or application initiation. MN 402 maintains at least one MN_Authenticator/MIP_Key_Data Payload pair in each queue.

3. Informative MN_Authenticator Support—MN 402 authentication using the MN_Authenticator gives the service provider the maximum flexibility in determining how to deliver the MN_Authenticator to the AAA server 420. The method of MN_Authenticator delivery is outside the scope of the 3GPP2 Standard. However, the MN_Authenticator may support MN authentication/fraud prevention in the 1xEV-DO environment, as described in the following possible provisioning scenario.

When a subscriber initially acquires their 1xEV-DO device and service, the point-of-sale representative records the subscription information into the billing/provision system via a computer terminal at the point-of-sale. The billing/provisioning system delivers certain information to the RADIUS AAA server 420 (e.g. NAI, MSID, ESN) including the MN_Authenticator which the point-of-sale representative retrieves via the MN 402 device's display. In the case of a modem, the manufacturer may have pre-loaded the MN_Authenticator and placed a copy of the MN_Authenticator on a sticker attached to the modem. The point-of-sale representative simply copies the 8 decimal digit value of the MN_Authenticator into the customer profile. Once MN 402 is loaded with the proper NAI and powered-up, MN 402 initiates the DMU procedure with the AAA server 420. The AAA server 420 compares the MN delivered MN_Authenticator with the billing system delivered MN_Authenticator. If the authenticators match, the AAA server 420 updates the subscriber profile with the delivered MIP keys and authorizes service. If the Post-Update option is enabled within the AAA server 420, the AAA server tentatively updates the subscription profile until receiving the MN_Authenticator via the billing/provisioning system.

As another option, the service provider may use an IVR system in which the 1xEV-DO subscriber calls a provisioning number and inputs the MN_Authenticator. The IVR system then delivers the MN_Authenticator to the AAA server 420 for final validation and Packet Data Access.

X. Preferred Implementation Requirements

This section defines specific preferred requirements for wireless DMU procedure, in accordance with an embodiment.

1. RSA Key Management—The service provider or wireless carrier generates the RSA Public/Private key pair(s). A carrier organization is designated to generate, manage, protect, and distribute RSA Private keys to the AAA Server 420 and the Public keys to the MN manufacturers in support of the DMU procedure. Each RSA Public/Private key pair, generated by the carrier, is assigned a unique Public Key Identifier in accordance with Section VIII above.

RSA Private keys are protected from disclosure to unauthorized parties. The carrier's organization with the responsibility of generating the RSA Public/Private key pairs establishes a RSA key management policy to protect the RSA Private (i.e., decryption) keys. RSA Private keys may be loaded into the RADIUS AAA server 420 manually. Access to the RADIUS AAA server RSA Private keys should be restricted to authorized personnel only.

RSA Public keys may be freely distributed to all MN manufacturers (along with the Public Key Identifier). Because one RSA Public key can be distributed to million of MNs, it is acceptable to distribute the RSA Public key (and Public Key Identifier) to MN manufacturers via e-mail, floppy disk, or a Web site. The preferred method is to simply publish the RSA Public key and associated Public Key Identifier in a DMU requirements document sent to each MN manufacturer/OEM.

The carrier may accept RSA Private key(s) (and Public Key Identifier) from MN manufacturers or other service providers that have preloaded MNs with manufacturer-generated RSA Public keys. The carrier could negotiate an agreement with another service provider in which both service providers share and protect each other's RSA Private keys.

2. RADIUS AAA Server—RADIUS AAA server 420 access is preferably limited to authorized personnel only. In accordance with the present invention, the RADIUS AAA server 420 supports 1024-bit RSA decryption. The RADIUS AAA server 420 also maintains a database of RSA Public/Private key pair indexed by the Public Key Identifier. The RADIUS AAA server 420 supports the RADIUS attributes specified in Section VI above.

Additionally, the RADIUS AAA server 420 supports a subscriber specific MIP Update Bit. When the MIP Update Bit is set, the AAA Server 420 initiates the DMU procedure by including the MIP_Key_Request attribute in an Access Reject message sent to the PDSN 410. The MIP Update Bit may be set by the carrier's billing/provisioning system based on IT policy. Upon verification of MN-AAA Authentication Extension using decrypted MN_AAA key, the AAA server 420 un-sets the MIP Update Bit.

The RADIUS AAA server 420 decrypts the encrypted portion of the MIP_Key_Data payload using the appropriate RSA Private (decryption) key. Also, the RADIUS AAA server 420 checks the MN_AAA Authentication Extension of the DMU RRQ using the decrypted MN_AAA key. The RADIUS AAA server 420 includes the AAA_Authenticator in the Access Accept as a 3GPP2 Radius Attribute. The RADIUS AAA server 420 supports the MN_Authenticator options specified in Section XI, above.

3. MN (Handset or Modem)—In the preferred form, the MN 402 manufacturer pre-loads the carrier's RSA Public key (and Public Key Identifier), and pre-generates and pre-loads the MN_Authenticator. The MN 402 also supports 1024-bit RSA encryption using the pre-loaded RSA Public key. Further, the MN 402 supports MN_AAA, MN_HA, and CHAP random/pseudo-random key generation (in accordance with RFC 1750). MN 402 supports random/pseudo-random AAA_Authenticator and MN_Authenticator generation (in accordance with RFC 1750), preferably.

Upon power-up of an MN 402 handset or launch of the MN client, the MN checks whether a MIP_Key_Data payload has been computed. If no MIP_Key_Data payload exists, the MN generates and stores a MIP_Key_Data payload. The MN 402 maintains at least one pre-generated MIP_Key_Data payload. The MN 402 constructs the MIP_Key_Data payload in accordance with Section IV, above. The MN 402 initiates the DMU procedure upon receipt of MIP Registration Reply with the MIP_Key_Request 3GPP2 Vendor/Organization-specific Extension.

Upon initiation of the DMU procedure, the MN 402 computes MIP authentication extensions using the newly-generated temporary MN_AAA and MN_HA keys. The MN 402 compares the $AAA\_Authenticator_{MN}$ (sent in the encrypted MIP_Key_Data payload) with the $AAA\_Authenticator_{AAA}$ (returned by the AAA server). If both values are the same, the MN 402 designates the temporary MN_AAA and MN_HA key as permanent.

The MN 402 supports reset (i.e., re-generation) of the MN_Authenticator by the MN 402 user as specified in Section IX. The MN 402 enables the MN user to view the MN_Authenticator. MN_Authenticator (24-bit random number) may be displayed as an 8 decimal digit number as specified in Section IX, above. The MN 402 manufacturer preferably pre-loads each MN 402 with a unique random 24-bit MN_Authenticator.

Upon reset of the MN_Authenticator, the MN 402 generates a new MIP_Key_Data payload. The MN 402 supports the 3GPP2 MIP Vendor/Organization-Specific Extensions specified in Section VII. DMU procedure is preferably performed between the AAA server 420 and a handset MN 402 only.

4. PDSN—The PDSN 410 supports the 3GPP2 RADIUS Vendor Specific Attributes specified in Section VI above and 3GPP2 MIP Vendor/Organization-Specific Extensions specified in Section VII above.

XI. Implementation Issues

There a several implementation issues associated with the preferred embodiment of the DMU procedure. For instance, the Mobile IP Vendor/Organization-Specific Extensions must be supported by the IS-2000/1xEV DO network. Since the current version of the IS-835 Standard does not specify MIP Vendor/Organization-Specific Extensions, the IS-835 Standard is modified (or extended) in accordance with the present invention. The DMU procedure is fully operable with current RADIUS AAA server procedures and, as described herein, does not interfere with future DIAMETER AAA server procedures.

While the foregoing has described what are considered to be the best mode and/or other preferred embodiments, it is understood that various modifications may be made therein and that the invention or inventions may be implemented in various forms and embodiments, and that they may be applied in numerous applications, only some of which have been described herein. As used herein, the terms "includes" and "including" mean without limitation. It is intended by the following claims to claim any and all modifications and variations that fall within the true scope of the inventive concepts.

APPENDIX

Acronym List

1x CDMA2000-1X
1xRTT Radio Transmission Technology—in 1.25 MHz CDMA band
3G Third Generation of Wireless Telephony
1xEV-DO 1x Evolution—Data Only
1xEV-DV 1x Evolution—Data-Voice
AAA Authentication, Authorization, and Accounting
AKD Authentication and Key Distribution
A-key Authentication Key
ARQ Access Request
BSC Base Station Controller
BTS Base Transceiver System
CDMA Code Division Multiple Access
CHAP Challenge Handshake Authentication Protocol
CN Correspondent Node
COA Care-of Address
DNS Domain Naming System
DDNS Dynamic Domain Naming System
DHCP Dynamic Handshake Challenge Protocol
DMU Dynamic Mobile IP Key Update FA Foreign Agent
GSM Global System for Mobile communications
GPRS General Packet Radio Service
HA Home Agent
HLR Home Location Register
IRM International Roaming MIN IP Internet Protocol
ISP Internet Service Provider
IVR Interactive Voice Response
MIN Mobile Identification Number
MIP Mobile IP
MN Mobile Node
MS Mobile Station
MSID Mobile Station ID
NAI Network Access Identifier
PCF Packet Control Function
PDSN Packet Data Serving Node
PPP Point-to-Point Protocol
PDA Portable Digital Assistant
PI Push Initiator
PKO Public Key Organization
RADIUS Remote Authentication Dial In User Service
RAN Radio Access Network
RN Radio Network
R-P Radio-Packet
RRQ Registration Request
SIP Simple IP
SMS Short Message Service
SMSC Short Message Service Center
SS7 Signaling System 7
SSD Shared Secret Data
TCP Transmission Control Protocol
UDP User Datagram Protocol
UDR User Data Record
UMTS Universal Mobile Telecommunications Systems
VLR Visitor Location Register

What is claimed is:

1. A method of distribution of at least one encryption key for use in controlling access of a mobile node to packet communication service via a wireless communication network, the method comprising:
   receiving a key update instruction in the mobile node via the wireless communication network;
   in response to the key update instruction, producing an encrypted key payload in the mobile node, wherein:
      the encrypted key payload comprises the at least one encryption key for the mobile node and a first authenticator value generated from the at least one encryption key; and
      the payload is encrypted with a public encryption key of a packet communication service control node of the wireless communication network;
   sending the encrypted key payload through the wireless communication network, from the mobile node to the packet communication service control node, for decryption thereof with a private key of the packet communication service control node corresponding to the public encryption key;
   receiving a reply message in the mobile node via the wireless communication network, the reply message containing a second authenticator value from the packet communication service control node; and
   designating the at least one encryption key in the mobile node for use in future procedures to obtain access to the packet communication service of the wireless communication network via the service control node, upon determining that the second authenticator value matches the first authenticator value.

2. The method of claim 1, wherein the at least one encryption key comprises one or more encryption keys for mobile internet protocol (MIP) service.

3. The method of claim 2, wherein the one or more encryption keys for MIP service comprise:
   a mobile node to home Authentication Authorization and Accounting server (MN-AAAh) encryption key; and a mobile node to home agent (MN-HA) encryption key.

4. The method of claim 1, wherein the at least one encryption key comprises a Challenge Handshake Authentication Protocol (CHAP) encryption key.

5. The method of claim 4, wherein the at least one encryption key further comprises:
   a mobile node to home Authentication Authorization and Accounting server (MN-AAAh) encryption key; and a mobile node to home agent (MN-HA) encryption key.

6. The method of claim 1, wherein the encrypted key payload further comprises a mobile authenticator value for authentication of the mobile node by the service control node.

7. The method of claim 1, wherein the producing of the encrypted key payload comprises reading of a selected one of a plurality of encrypted key payloads from pre-loaded storage in the mobile node.

8. The method of claim 1, wherein the producing of the encrypted key payload comprises:
   generating the at least one encryption key in the mobile node;
   generating, in the mobile node, the first authenticator value, using the at least one encryption key;
   forming key payload data containing the at least one encryption key and the first authenticator value; and
   and encrypting the key payload data with the public encryption key of the packet communication service control node, to form the encrypted key payload in the mobile node.

9. The method of claim 1, further comprising:
   loading the public encryption key into the mobile node; and
   loading the private decryption key corresponding to the public encryption key into the packet communication service control node, to associate the public encryption key and the corresponding private decryption key with the packet communication service control node.

10. The method of claim 1, wherein the mobile node comprises a Code Division Multiple Access (CDMA) mobile station.

11. The method of claim 10, wherein:
    the wireless communication network is a CDMA network; and
    the packet communication service control node comprises a home Authentication Authorization and Accounting (AAA) server of the CDMA network.

12. A mobile station for packet communication via a wireless communication network, the mobile station comprising:
    a transmitter/receiver for transmitting and receiving packet data signals via the wireless communication network;
    a controller coupled to the transmitter/receiver for controlling operations the mobile station; and
    memory for storing key related data and programming for execution by the controller;
    wherein execution of the programming by the controller causes the mobile station to implement operations, including:
    receiving a key update instruction via the wireless communication network;
    in response to the key update instruction, producing an encrypted key payload, wherein:

the encrypted key payload comprises at least one encryption key for the mobile station and a first authenticator value generated from the at least one encryption key; and the payload is encrypted with a public encryption key of a packet communication service control node of the wireless communication network;

sending the encrypted key payload through the wireless communication network, to the packet communication service control node, for decryption thereof with a private key of the packet communication service control node corresponding to the public encryption key;

receiving a reply message via the wireless communication network, the reply message containing a second authenticator value from the packet communication service control node; and designating the at least one encryption key in the mobile station for use in future procedures to obtain access to the packet communication service of the wireless communication network via the service control node, upon determining that the second authenticator value matches the first authenticator value.

13. The mobile station of claim 12, wherein the at least one encryption key comprises one or more encryption keys for mobile internet protocol (MIP) service.

14. The mobile station of claim 13, wherein the one or more encryption keys for MIP service comprise:
a mobile node to home Authentication Authorization and Accounting server (MN-AAAh) encryption key; and a mobile node to home agent (MN-HA) encryption key.

15. The mobile station of claim 12, wherein the at least one encryption key comprises a Challenge Handshake Authentication Protocol (CHAP) encryption key.

16. The mobile station of claim 15, wherein the at least one encryption key further comprises:
a mobile node to home Authentication Authorization and Accounting server (MN-AAAh) encryption key; and a mobile node to home agent (MN-HA) encryption key.

17. The mobile station of claim 12, wherein the encrypted key payload further comprises a mobile authenticator value for authentication of the mobile station by the service control node.

18. The mobile station of claim 12, wherein:
the memory stores a plurality of encrypted key payloads; and
the execution of the programming causes the controller to read a selected one of the encrypted key payloads from the memory in response to the key update instruction.

19. The mobile station of claim 12, wherein the production of the encrypted key payload comprises:
generating the at least one encryption key in the mobile station;
generating, in the mobile station, the first authenticator value, using the at least one encryption key;
forming key payload data containing the at least one encryption key and the first authenticator value; and
and encrypting the key payload data with the public encryption key associated with the packet communication service control node, to form the encrypted key payload.

20. A method of distribution of at least one encryption key for use in controlling access of a mobile node to packet communication service via a wireless communication network, the method comprising:
issuing a key update instruction to the mobile node via the wireless communication network;
receiving a message from the mobile node containing an identifier of the mobile node, a key identifier and an encrypted key payload;
selecting a private decryption key from among a plurality of private decryption keys, based on the key identifier;
decrypting the encrypted key payload using the selected private decryption key, to recover a mobile node authentication value, a server authentication value, and the at least one encryption key for possible association with the mobile node; and
responsive to the recovered mobile node authentication value matching a stored mobile node authentication value for the mobile node indicated by the received mobile node identifier,
(a) storing the at least one encryption key in an access server for future use in controlling packet communication service via the wireless communication network for the mobile node; and
(b) sending a reply message via the wireless communication network to the mobile node, the reply message containing the server authentication value.

21. The method of claim 20, wherein the at least one encryption key comprises one or more encryption keys for mobile internet protocol (MIP) service.

22. The method of claim 21, wherein the one or more encryption keys for MIP service comprise:
a mobile node to home Authentication Authorization and Accounting server (MN-AAAh) encryption key; and a mobile node to home agent (MN-HA) encryption key.

23. The method of claim 20, wherein the at least one encryption key comprises a Challenge Handshake Authentication Protocol (CHAP) encryption key.

24. The method of claim 23, wherein the at least one encryption key further comprises:
a mobile node to home Authentication Authorization and Accounting server (MN-AAAh) encryption key; and a mobile node to home agent (MN-HA) encryption key.

25. The method of claim 20, further comprising:
generating the public encryption key, private decryption key and key identifier;
loading the public encryption key and key identifier into the mobile node; and
storing the private decryption key as one of the plurality of private decryption keys in the access server in such a manner as to be accessible using the key identifier.

26. The method of claim 20, wherein the mobile node comprises a CDMA mobile station.

27. The method of claim 26, wherein:
the wireless communication network is a CDMA network; and
the access server comprises a home Authentication Authorization and Accounting (AAA) server of the CDMA network.

* * * * *